United States Patent
Maki

(10) Patent No.: US 10,083,382 B2
(45) Date of Patent: Sep. 25, 2018

(54) IMAGE FORMING APPARATUS EQUIPPED WITH SECURE PRINT FUNCTION, METHOD OF CONTROLLING THE SAME, AND STORAGE MEDIUM

(71) Applicant: CANON KABUSHIKI KAISHA, Tokyo (JP)

(72) Inventor: Nobuhiko Maki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/048,235

(22) Filed: Feb. 19, 2016

(65) Prior Publication Data

US 2016/0171355 A1    Jun. 16, 2016

Related U.S. Application Data

(63) Continuation of application No. 14/168,163, filed on Jan. 30, 2014, now Pat. No. 9,299,018.

(30) Foreign Application Priority Data

Jan. 30, 2013 (JP) .................................. 2013-015647

(51) Int. Cl.
*G06F 21/60*    (2013.01)
*G06F 21/62*    (2013.01)
(Continued)

(52) U.S. Cl.
CPC ....... *G06K 15/4095* (2013.01); *G06F 3/1222* (2013.01); *G06F 3/1238* (2013.01);
(Continued)

(58) Field of Classification Search
None
See application file for complete search history.

(56) References Cited

U.S. PATENT DOCUMENTS

| | | | |
|---|---|---|---|
| 6,745,334 B1 | 6/2004 | Ikegami | |
| 7,249,900 B1 * | 7/2007 | Katano | G06F 3/1222 358/1.15 |

(Continued)

FOREIGN PATENT DOCUMENTS

| | | |
|---|---|---|
| CN | 1453697 A | 11/2003 |
| CN | 1979513 A | 6/2007 |

(Continued)

OTHER PUBLICATIONS

Extended European Search Report issued in EP14000251.0, dated May 28, 2014.

(Continued)

*Primary Examiner* — Beniyam Menberu
(74) *Attorney, Agent, or Firm* — Rossi, Kimms & McDowell LLP

(57) ABSTRACT

An image forming apparatus capable of flexibly controlling whether or not to perform user authentication when a user performs operations related to functions of the apparatus. When a user instructs the apparatus to perform any of operations related to a secure print job which is a print job executed by using a secure print function, when the apparatus is operated in a function-based authentication mode, it is determined whether or not a user-selected function of a plurality of functions including at least a secure printing function for printing data in response to an input of a password requires user authentication. When the secure printing function is specified as the user-selected function and it is determined that the user-selected function does not require user authentication, the user is allowed to use the secure printing function, even if the user is not authenticated.

20 Claims, 15 Drawing Sheets

(51) Int. Cl.
  *H04N 1/44* (2006.01)
  *G06F 3/12* (2006.01)
  *G06K 15/02* (2006.01)
  *G06K 15/00* (2006.01)

(52) U.S. Cl.
  CPC .......... *G06F 3/1258* (2013.01); *G06F 3/1285* (2013.01); *G06F 21/608* (2013.01); *G06F 21/629* (2013.01); *H04N 1/444* (2013.01); *H04N 1/4413* (2013.01); *G06F 2221/2141* (2013.01)

(56) References Cited

U.S. PATENT DOCUMENTS

| | | | |
|---|---|---|---|
| 7,936,467 B2 | 5/2011 | Shimizu | |
| 2003/0061322 A1* | 3/2003 | Igarashi | H04L 29/12009 709/223 |
| 2004/0111644 A1* | 6/2004 | Saunders | G06F 21/41 726/8 |
| 2005/0100378 A1 | 5/2005 | Kimura et al. | |
| 2005/0188226 A1* | 8/2005 | Kasatani | H04L 67/02 726/5 |
| 2005/0254070 A1 | 11/2005 | Sayama | |
| 2006/0001897 A1* | 1/2006 | Ogasawara | H04N 1/32128 358/1.13 |
| 2006/0132824 A1 | 6/2006 | Aritomi | |
| 2007/0061573 A1* | 3/2007 | Dokuni | G06F 21/608 713/170 |
| 2007/0067680 A1* | 3/2007 | Harada | G06F 21/608 714/45 |
| 2007/0076238 A1* | 4/2007 | Odagiri | G06F 21/608 358/1.14 |
| 2007/0079360 A1* | 4/2007 | Roberts | G06F 21/41 726/4 |
| 2007/0081184 A1 | 4/2007 | Daos et al. | |
| 2007/0103712 A1* | 5/2007 | Corona | G06F 21/335 358/1.14 |
| 2007/0133044 A1 | 6/2007 | Tanaka | |
| 2007/0214494 A1 | 9/2007 | Uruta et al. | |
| 2007/0253013 A1* | 11/2007 | Shudo | G06F 21/608 358/1.14 |
| 2007/0282995 A1 | 12/2007 | Mizuno et al. | |
| 2008/0189716 A1* | 8/2008 | Nakahara | G06F 21/608 718/105 |
| 2009/0015866 A1* | 1/2009 | Iwamoto | G06F 21/608 358/1.15 |
| 2009/0268227 A1 | 10/2009 | Kaneko | |
| 2010/0007916 A1* | 1/2010 | Ikeda | H04N 1/00347 358/1.15 |
| 2010/0064256 A1* | 3/2010 | Esaki | H04N 1/00413 715/825 |
| 2010/0100968 A1 | 4/2010 | Urasawa | |
| 2010/0115608 A1* | 5/2010 | Uchikawa | G06F 21/84 726/18 |
| 2010/0208286 A1 | 8/2010 | Iwata | |
| 2010/0235888 A1* | 9/2010 | Miyamoto | G06F 21/608 726/4 |
| 2010/0302575 A1 | 12/2010 | Hanaoka et al. | |
| 2011/0030068 A1 | 2/2011 | Imai | |
| 2011/0134462 A1 | 6/2011 | Suto | |
| 2011/0222103 A1 | 9/2011 | Doui | |
| 2011/0255112 A1 | 10/2011 | Martin et al. | |
| 2012/0137208 A1* | 5/2012 | Ito | H04N 1/00204 715/234 |
| 2012/0162714 A1* | 6/2012 | Ohhashi | G06F 3/122 358/1.15 |
| 2012/0192264 A1 | 7/2012 | Sugiyama | |
| 2012/0260350 A1* | 10/2012 | Yamada | H04N 1/00411 726/28 |
| 2013/0070282 A1* | 3/2013 | Takahashi | G06F 3/1222 358/1.14 |
| 2013/0169989 A1* | 7/2013 | Oki | G06F 3/12 358/1.14 |
| 2013/0212151 A1 | 8/2013 | Herbach et al. | |
| 2013/0250342 A1* | 9/2013 | Kaku | H04N 1/00408 358/1.14 |
| 2013/0308156 A1* | 11/2013 | Kakutani | G06K 15/4095 358/1.14 |

FOREIGN PATENT DOCUMENTS

| | | |
|---|---|---|
| CN | 102739896 A | 10/2012 |
| EP | 1603320 A2 | 12/2005 |
| JP | 2000076028 A | 3/2000 |
| JP | 2008265081 A | 11/2008 |
| JP | 2012221069 A | 11/2012 |
| KR | 1020050045938 A | 5/2005 |
| RU | 2450323 C2 | 5/2012 |

OTHER PUBLICATIONS

Search Report issued in SG2014004469, dated Jul. 8, 2014.
"Xerox Color 550/560 Printer, Security Function Supplementary Guide", Version 1.0, Apr. 2011, pp. 1-64, http://www.xerox.com/download/security/security-guidance/477c5-4aab4c1606d80/cert_Xerox_Color_550-560_Printer Supplementary_Guide3.pdf.
"Xerox WorkCentre 5735/5740/5745/5755/5765/5775/5790 System Administrator Guide", Version 2.0, Dec. 2010, pp. 1-362, http://download.support.xerox.com/pub/docs/WC5735_WC5740_WC5745_WC5755/userdocs/any-ps/en/SAG.pdf.
"Color Multifunction Devices Black and White Multifunction Devices Color Printers Black and White Printers Super G3 Facsimiles", Ricoh Aficio Common Security Features Guide, Version 11, 2009, 27 pages. http://www.oit.uci/edu/security/RicohCommonSecurityFeaturesGuide.pdf.
European Search Report issued in EP14000251.0, dated Jun. 5, 2015.
Decision on Grant issued in RU2014102942, dated Sep. 11, 2015.
Office Action issued in U.S. Appl No. 14/168,163, dated Nov. 19, 2014.
Office Action issued in U.S. Appl No. 14/168,163, dated Feb. 24, 2015.
Notice of Allowance issued in U.S. Appl No. 14/168,163, dated Nov. 20, 2015.
"Xerox Color 5501560 Printer, Security Function Supplementary Guide", Version 1.0, Apr. 2011, pp. 1-64, http://www.xerox.com/download/security/security-guidance/477c5-4aab4c1606d80/cert_Xerox_Color_550-560_Printer Supplementary_Guide3.pdf.
"Xerox WorkCentre 5735/5740/5745/5755/5765/5775/5790 System Administrator Guide", Version 2.0, Dec. 2010, pp. 1-362, http://download.support.xerox.com/pub/docs/WC5735_WC5740_WC5745_WC5755/userdocs/any-os/en/SAG.pdf.
Office Action issued in Chinese Appln. No. 201410037710.1 dated Jul. 11, 2016. English translation provided.

* cited by examiner

FIG. 7A

| SELECT | RECEIPT NUMBER | TIME | JOB NAME | USER NAME | STATUS |
|---|---|---|---|---|---|
| ✓ | 0001 | 16:10 | Document1 | User1 | IN QUEUE |
| | 0002 | 16:20 | Document2 | User1 | IN QUEUE |
| | 0003 | 16:30 | ******** | User2 | IN QUEUE |
| | 0004 | 16:40 | ******** | User3 | IN QUEUE |
| | 0005 | 16:50 | Document5 | User1 | IN QUEUE |

SECURE PRINT HANDLING SCREEN — 8001
8005, 8002
8004 [CANCEL] [PRINT] — 8003

FIG. 7B

SECURE PRINT HANDLING SCREEN — 8001

| SELECT | RECEIPT NUMBER | TIME | JOB NAME | USER NAME | STATUS |
|---|---|---|---|---|---|
| ✓ | 0001 | 16:10 | ******** | User1 | IN QUEUE |
| | 0002 | 16:20 | ******** | User1 | IN QUEUE |
| | 0003 | 16:30 | ******** | User2 | IN QUEUE |
| | 0004 | 16:40 | ******** | User3 | IN QUEUE |
| | 0005 | 16:50 | ******** | User1 | IN QUEUE |

SECURE PRINT HANDLING SCREEN — 8001

| SELECT | RECEIPT NUMBER | TIME | JOB NAME | USER NAME | STATUS |
|---|---|---|---|---|---|
| ✓ | 0001 | 16:10 | Document1 | User1 | IN QUEUE |
| | 0002 | 16:20 | Document2 | User1 | IN QUEUE |
| | 0003 | 16:30 | Document3 | User2 | IN QUEUE |
| | 0004 | 16:40 | Document4 | User3 | IN QUEUE |
| | 0005 | 16:50 | Document5 | User1 | IN QUEUE |

8005, 8002
8004 [CANCEL] [PRINT] — 8003

FIG. 10A

SECURE PRINT HANDLING SCREEN — 8001

| SELECT | RECEIPT NUMBER | TIME | JOB NAME | USER NAME | STATUS |
|---|---|---|---|---|---|
| ☐ | 0001 | 16:10 | ******** | User1 | IN QUEUE |
| ☐ | 0002 | 16:20 | ******** | User1 | IN QUEUE |
| ☐ | 0003 | 16:30 | ******** | User2 | IN QUEUE |
| ☐ | 0004 | 16:40 | ******** | User3 | IN QUEUE |
| ☐ | 0005 | 16:50 | ******** | User1 | IN QUEUE |
| ✓ | 0006 | 17:00 | Document6 | User4 | IN QUEUE |

8005 — SELECT column
8002 — table
8004 — [CANCEL]    8003 — [PRINT]

FIG. 10B

SECURE PRINT HANDLING SCREEN — 8001

| SELECT | RECEIPT NUMBER | TIME | JOB NAME | USER NAME | STATUS |
|---|---|---|---|---|---|
| ☐ | 0001 | 16:10 | Document1 | User1 | IN QUEUE |
| ☐ | 0002 | 16:20 | Document2 | User1 | IN QUEUE |
| ☐ | 0003 | 16:30 | Document3 | User2 | IN QUEUE |
| ☐ | 0004 | 16:40 | Document4 | User3 | IN QUEUE |
| ☐ | 0005 | 16:50 | Document5 | User1 | IN QUEUE |
| ✓ | 0006 | 17:00 | ******** | User4 | IN QUEUE |

8005 — SELECT column
8002 — table
8004 — [ ]    8003 — [ ]

FIG. 12A

SECURE PRINT HANDLING SCREEN — 8001

| SELECT | RECEIPT NUMBER | TIME | JOB NAME | USER NAME | STATUS |
|---|---|---|---|---|---|
| ✓ | 0001 | 16:10 | Document1 | User1 | IN QUEUE |
| ☐ | 0002 | 16:20 | Document2 | User1 | IN QUEUE |
| ☐ | 0003 | 16:30 | Document3 | User2 | IN QUEUE |
| ☐ | 0004 | 16:40 | Document4 | User3 | IN QUEUE |
| ☐ | 0005 | 16:50 | Document5 | User1 | IN QUEUE |
| ☐ | 0006 | 17:05 | Document6 | User4 | IN QUEUE |
| ☐ | 0006 | 17:06 | Document7 | User3 | IN QUEUE |
| ☐ | 0007 | 17:10 | Document8 | User2 | IN QUEUE |

8005 — SELECT column
8002 — table
8004 — (shaded button)
8003 — PRINT

FIG. 12B

SECURE PRINT HANDLING SCREEN — 8001

| SELECT | RECEIPT NUMBER | TIME | JOB NAME | USER NAME | STATUS |
|---|---|---|---|---|---|
| ✓ | 0001 | 16:10 | Document1 | User1 | IN QUEUE |
| ☐ | 0002 | 16:20 | Document2 | User1 | IN QUEUE |
| ☐ | 0003 | 16:30 | Document3 | User2 | IN QUEUE |
| ☐ | 0004 | 16:40 | Document4 | User3 | IN QUEUE |
| ☐ | 0005 | 16:50 | Document5 | User1 | IN QUEUE |
| ☐ | 0006 | 17:05 | Document6 | User4 | IN QUEUE |
| ☐ | 0006 | 17:06 | Document7 | User3 | IN QUEUE |
| ☐ | 0007 | 17:10 | Document8 | User2 | IN QUEUE |

8005 — SELECT column
8002 — table
8004 — CANCEL
8003 — PRINT

FIG. 12C

SECURE PRINT HANDLING SCREEN — 8001

| SELECT | RECEIPT NUMBER | TIME | JOB NAME | USER NAME | STATUS |
|---|---|---|---|---|---|
| ✓ | 0001 | 16:10 | Document1 | User1 | IN QUEUE |
| ☐ | 0002 | 16:20 | Document2 | User1 | IN QUEUE |
| ☐ | 0005 | 16:50 | Document5 | User1 | IN QUEUE |

8005 — SELECT column
8002 — table
8006 — DISPLAY ALL JOBS
8004 — CANCEL
8003 — PRINT

FIG. 14A

| SELECT | RECEIPT NUMBER | TIME | JOB NAME | USER NAME | STATUS |
|---|---|---|---|---|---|
| ✓ | 0001 | 16:10 | ******** | User1 | OK |
|  | 0002 | 16:20 | ******** | User1 | OK |
|  | 0003 | 16:30 | ******** | User2 | OK |
|  | 0004 | 16:40 | ******** | User3 | NG |
|  | 0005 | 16:50 | ******** | User1 | OK |
|  | 0006 | 17:05 | ******** | User4 | OK |
|  | 0006 | 17:06 | ******** | User3 | OK |
|  | 0007 | 17:10 | ******** | User2 | NG |

JOB HISTORY SCREEN — 10001
10005, 10002, 10007

FIG. 14B

| SELECT | RECEIPT NUMBER | TIME | JOB NAME | USER NAME | STATUS |
|---|---|---|---|---|---|
| ✓ | 0001 | 16:10 | Document1 | User1 | OK |
|  | 0002 | 16:20 | Document2 | User1 | OK |
|  | 0003 | 16:30 | Document3 | User2 | OK |
|  | 0004 | 16:40 | Document4 | User3 | NG |
|  | 0005 | 16:50 | Document5 | User1 | OK |
|  | 0006 | 17:05 | Document6 | User4 | OK |
|  | 0006 | 17:06 | Document7 | User3 | OK |
|  | 0007 | 17:10 | Document8 | User2 | NG |

JOB HISTORY SCREEN — 10001
DETAILED INFORMATION — 10007

FIG. 14C

| SELECT | RECEIPT NUMBER | TIME | JOB NAME | USER NAME | STATUS |
|---|---|---|---|---|---|
| ✓ | 0001 | 16:10 | Document1 | User1 | OK |
|  | 0002 | 16:20 | Document2 | User1 | OK |
|  | 0003 | 16:30 | ******** | User2 | OK |
|  | 0004 | 16:40 | ******** | User3 | NG |
|  | 0005 | 16:50 | Document5 | User1 | OK |
|  | 0006 | 17:05 | ******** | User4 | OK |
|  | 0006 | 17:06 | ******** | User3 | OK |
|  | 0007 | 17:10 | ******** | User2 | NG |

JOB HISTORY SCREEN — 10001
DETAILED INFORMATION — 10007

IMAGE FORMING APPARATUS EQUIPPED WITH SECURE PRINT FUNCTION, METHOD OF CONTROLLING THE SAME, AND STORAGE MEDIUM

BACKGROUND OF THE INVENTION

Field of the Invention

The present invention relates to an image forming apparatus equipped with a secure print function, a method of controlling the same, and a storage medium.

Description of the Related Art

There has been generally known a system in which print data transmitted from an external apparatus, such as a PC (personal computer), is reserved in an image forming apparatus, and the reserved print data is printed according to a user's operation performed on a operation panel of the image forming apparatus. This printing is generally referred to as the reservation printing.

In this reservation printing, reserved print data can be printed when the user enters a password or performs user authentication on an operation screen of the image forming apparatus.

This reservation printing is particularly effective in delivering a printout which the user does not want others to view, when the image forming apparatus is a shared printer connected to a network.

As an example of the conventional technique related to reservation printing, there has been proposed a method in which a print job to which a password is added is transmitted from a PC to an image forming apparatus, and printing is executed when the same password as that added to the print job is input from the operation panel of the image forming apparatus (Japanese Patent Laid-Open Publication No. 2000-76028).

Although printing using the method of reservation printing is sometimes referred to as secure printing, confidential printing, private printing, authentication printing, and so on, in the present invention, it is expressed as a secure print job.

Specifically, the secure print job is, as a general rule, a job executed such that printing is started when a correct password is inputted by a user from a console section of the image forming apparatus, and security of the print job is ensured by placing password-based restrictions on printing. In this case, however, password-based restrictions on printing cannot be placed on a normal print job which is not a secure print job.

Further, as another method of ensuring security of a print job, there has been proposed a method of controlling access to a print job, by managing print jobs in association with user information of users who are managed by the image forming apparatus.

In this method, before transmitting a print job from an external apparatus, the user adds a user name to the print job. Then, user authentication is performed by the user inputting the user name and a password to the image forming apparatus or by the user holding an IC card over a card reader of the image forming apparatus.

Then, the image forming apparatus extracts, from all print jobs, those having a user name added thereto which matches the user name authenticated by the image forming apparatus, and allows the user to perform only operations for the extracted print jobs.

According to this method, it is possible to prevent one's print job, including not only a secure print job, but also a normal print job, from being unauthorizedly handled by others, and hence it is possible to ensure security of all print jobs.

Further, some of the image forming apparatuses that perform user authentication are equipped with a function of also authenticating users who are not managed by the image forming apparatus, as guest users. This function is provided for users who want to temporarily use the image forming apparatus.

This function makes it possible to temporarily allow, for example, in a case where the image forming apparatus is equipped with a plurality of functions, such as a copy function, a scan function, and a print function, a person as a visitor from the outside to use the copy function so as to copy a document as a guest user.

In the case where a user is authenticated as a guest user, the image forming apparatus cannot identify the user, and hence restricts handling of a print job from the viewpoint of prevention of information leakage. That is, in general, the image forming apparatus does not allow a guest user to handle a print job.

Particularly in controlling access to a print job according to authentication of a user by the image forming apparatus, the above-described conventional technique has the following problem:

Among image forming apparatuses that provide a plurality of functions, such as a copy function, a scan function, and a print function, there is one which is equipped with a function of switching whether or not to require user authentication, on a function-by-function basis.

Examples of the above-mentioned function include a function-based authentication function which configures the plurality of functions, for example, in such a manner that the copy function is allowed to be used without user authentication whereas the scan function essentially requires user authentication.

The function-based authentication function is provided for the purpose of saving a user normally managed by the image forming apparatus from the time and effort of performing an authentication operation, when the user uses a function of the image forming apparatus, which is determined, from the viewpoint of management, not to essentially require user authentication. That is, the function-based authentication function is different in purpose from the case where the above-mentioned guest user uses the image forming apparatus.

Although the purpose is different, also in a case where user authentication is not performed in using the function-based authentication function, the image forming apparatus cannot identify a user, similarly to the above-mentioned case of the guest user.

On the other hand, from the viewpoint of security, a print job requires execution of access control on a user-by-user basis, and hence requires identification of a user.

Therefore, it is required to make user authentication essential to a print job handling function, and this makes it impossible to save the user from having to perform an authentication operation.

SUMMARY OF THE INVENTION

The present invention provides an image forming apparatus which is capable of flexibly controlling whether or not to perform user authentication when a user performs operations related to various functions of the image forming apparatus, a method of controlling the same, and a storage medium.

In a first aspect of the present invention, there is provided an image forming apparatus comprising a login unit configured to allow a user to log in to the image forming apparatus, a determination unit configured to determine, in a case where the image forming apparatus operates in a function-based authentication mode, whether or not a user-selected function of a plurality of functions requires user authentication, the plurality of functions including at least a secure printing function for printing data in response to an input of a password, and a permission unit configured to, in a case where the secure printing function is specified as the user-selected function and it is determined by the determination unit that the user-selected function does not require user authentication, allow the user to use the secure printing function, even if the user is not authenticated.

In a second aspect of the present invention, there is provided a method of controlling an image forming apparatus including a login unit configured to allow a user to log in to the image forming apparatus, comprising determining, in a case where the image forming apparatus operates in a function-based authentication mode, whether or not a user-selected function of a plurality of functions requires user authentication, the plurality of functions including at least a secure printing function for printing data in response to an input of a password, and allowing, in a case where the secure printing function is specified as the user-selected function and it is determined by said determining that the user-selected function does not require user authentication, the user to use the secure printing function, even if the user is not authenticated.

In a third aspect of the present invention, there is provided a non-transitory computer-readable storage medium storing a computer-executable program for executing a method of controlling an image forming apparatus including a login unit configured to allow a user to log in to the image forming apparatus, wherein the method comprises determining, in a case where the image forming apparatus operates in a function-based authentication mode, whether or not a user-selected function of a plurality of functions requires user authentication, the plurality of functions including at least a secure printing function for printing data in response to an input of a password, and allowing, in a case where the secure printing function is specified as the user-selected function and it is determined by said determining that the user-selected function does not require user authentication, the user to use the secure printing function, even if the user is not authenticated.

According to the present invention, it is possible to provide an image forming apparatus which is capable of flexibly controlling whether or not to perform user authentication when a user performs operations related to various functions of the image forming apparatus, a method of controlling the same, and a storage medium.

Further features of the present invention will become apparent from the following description of exemplary embodiments with reference to the attached drawings.

BRIEF DESCRIPTION OF THE DRAWINGS

FIGS. 7A to 7C are diagrams showing examples of a secure print handling screen displayed on the console section.

FIGS. 10A and 10B are diagrams showing examples of the secure print handling screen displayed as a result of the process in FIG. 9B.

FIGS. 12A to 12C are diagrams showing examples of the secure print handling screen displayed on the console section.

FIGS. 14A to 14C are diagrams showing examples of a job history screen displayed on the console section.

DESCRIPTION OF THE EMBODIMENTS

The present invention will now be described in detail below with reference to the accompanying drawings showing embodiments thereof.

Figure 1:
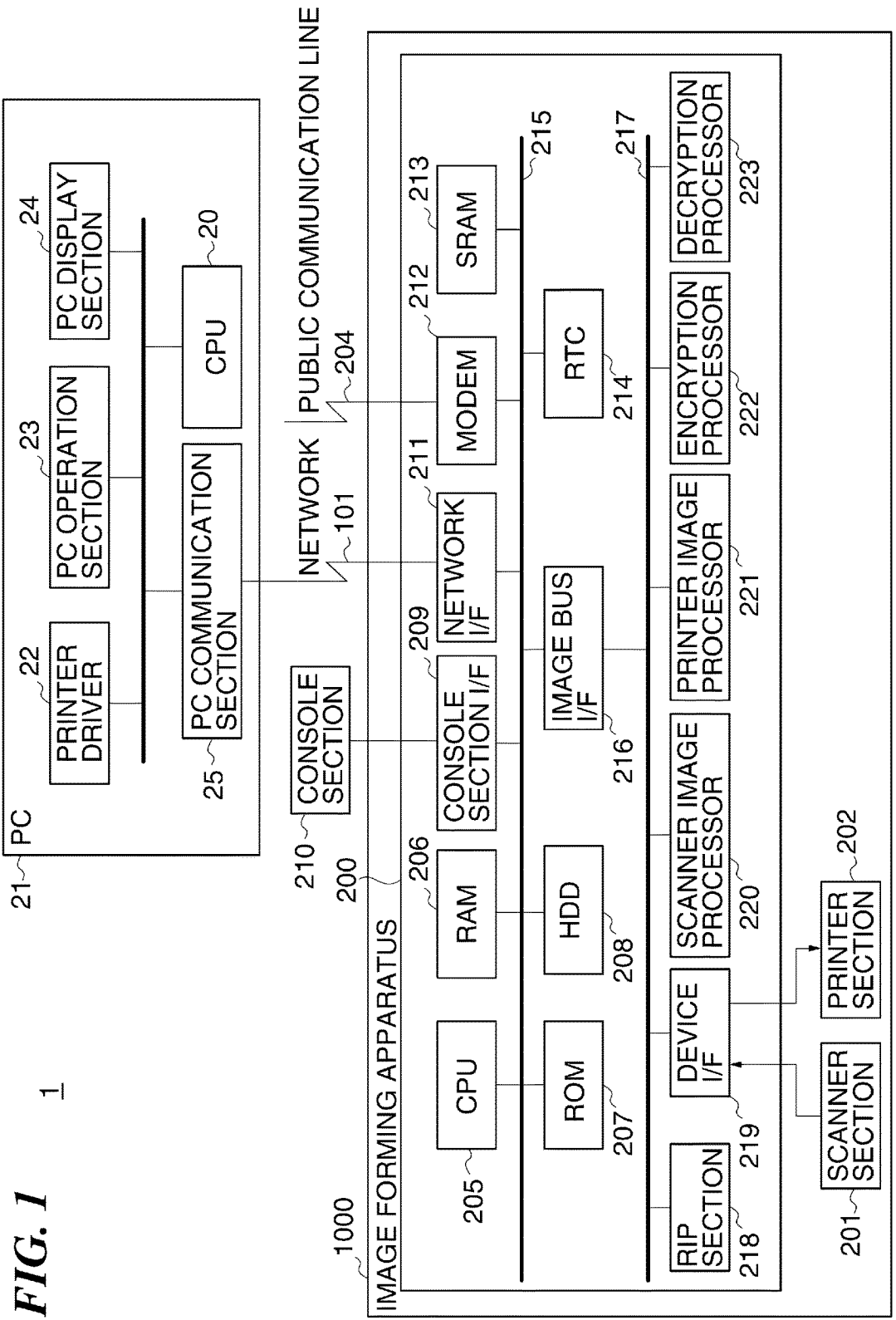
FIG. 1 is a schematic diagram of an image forming system including an image forming apparatus according to a first embodiment of the present invention.

FIG. 1 is a schematic diagram of an image forming system 1 including an image forming apparatus according to a first embodiment of the present invention.

Referring to FIG. 1, the image forming system 1 comprises the image forming apparatus, denoted by reference numeral 1000, and a PC 21, which are connected to each other by a network 101.

A control unit 200 of the image forming apparatus 1000 is connected to a scanner section 201 which is an image input device, a printer section 202 configured to print an image on a recording sheet, the network 101, and a public communication line 204, to thereby input and output image data and device information.

Further, the control unit 200 includes a CPU 205, a RAM 206, a ROM 207, a HDD 208, a console section interface 209, a network interface 211, a modem 212, an SRAM 213, and an RTC 214, which are connected to a system bus 215.

The CPU 205 is a processor that controls the overall operation of the image forming apparatus 1000. The RAM 206 is a system work memory used for operation of the CPU 205, and also functions as a memory for temporarily storing image data, user information, passwords, and so on.

The ROM 207 is a boot ROM that stores a boot program for the image forming apparatus 1000. The HDD 208 is a hard disk drive, and stores system software, application programs, image data, and so forth. The HDD 208 further stores programs for executing processes, described hereinafter.

The console section interface 209 provides interface with a console section 210 having a touch panel, and outputs image data to the console section 210, which is to be displayed on the console section 210. Further, the console section interface 209 transfers information to the CPU 205, which is input by a user from the console section 210 to the image forming apparatus 1000.

The network interface 211 is connected to the network 101 to input and output information from and to external apparatuses. The modem 212 is connected to the public communication line 204 to input and output information from and to external apparatuses. The SRAM 213 is a volatile storage device which can operate at a high speed. In the present embodiment, however, the SRAM 213 is configured to be equivalent to a nonvolatile storage device by making use of a backup power supply.

The RTC 214 is a real time clock, and continues counting the current time even in a state where the control unit 200 is not powered on.

The control unit 200 further includes an RIP section 218, a device interface 219, a scanner image processor 220, a printer image processor 221, an encryption processor 222, and a decryption processor 223, which are connected to each other by an image bus 217. The image bus 217 and the system bus 215 are connected by an image bus interface 216 which is a bus bridge that converts the data structure. The image bus 217 is a PCI bus.

The RIP section 218 is a raster image processor that converts a PDL code to a bitmap image. The device interface 219 connects the control unit 200 to the scanner section 201 and the printer section 202 to perform synchronous-to-asynchronous or asynchronous-to-synchronous conversion of image data.

The scanner image processor 220 performs correction, manipulation, and editing of image data input from the scanner section 201. The printer image processor 221 performs correction, resolution conversion, etc. of image data to be printed out. The encryption processor 222 performs processing for encrypting input data including image data. The decryption processor 223 performs processing for decrypting encrypted data.

On the other hand, the PC 21 comprises a CPU 20, a printer driver 22, a PC operation section 23, a PC display section 24, and a PC communication section 25. The CPU 20 controls the overall operation of the PC 21. The printer driver 22 is a driver for controlling the image forming apparatus 1000. The PC operation section 23 comprises a keyboard, a mouse, and so forth. The PC display section 24 is a display for displaying information to a user. The PC communication section 25 is a NIC (network interface controller) for connecting to the network 101.

With the above-described configuration, the image forming apparatus 1000 executes a print job for printing an image on a recording sheet, and a user can perform operations related to the print job. Further, a print job is executed according to an instruction from the PC 21, and an expression "to send a print job" means "to transmit, from the PC 21, print data for instructing the image forming apparatus 1000 to execute a print job".

Next, transmission of a print job from the PC 21 will be described. When sending a print job, a user configures settings on the PC operation section 23.

Figure 2A:
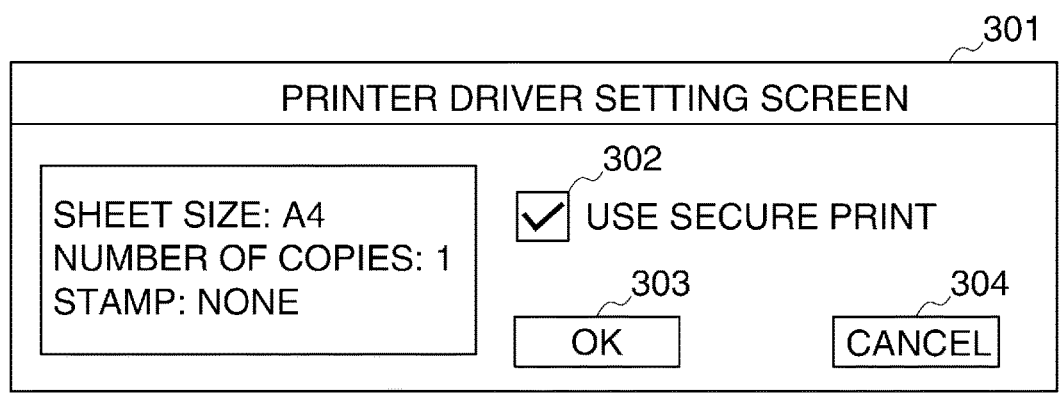
FIGS. 2A and 2B are diagrams each showing an example of a setting screen displayed on a PC display section appearing in FIG. 1.
Figure 2B:
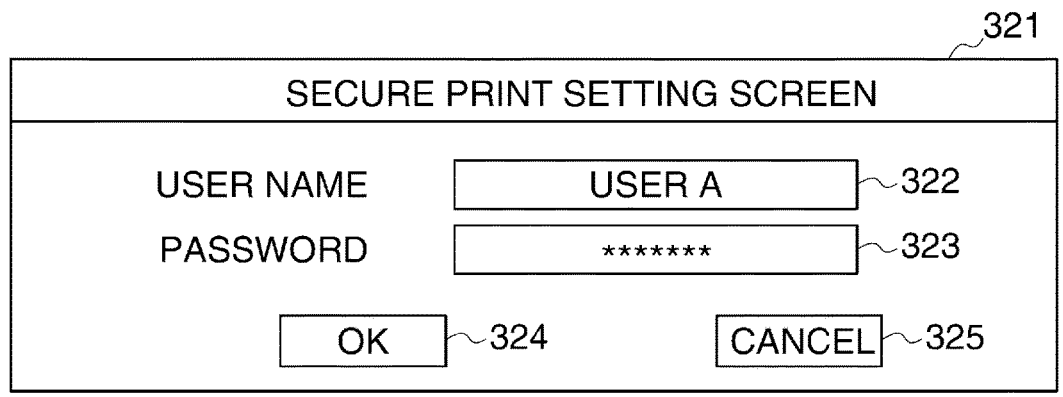

FIGS. 2A and 2B are diagrams each showing an example of a setting screen displayed on the PC display section 24 appearing in FIG. 1.

FIG. 2A shows a printer driver setting screen, and FIG. 2B shows a secure print setting screen.

On these setting screens, a secure print job can be set. The secure print job is a job which allows a user to perform operations related to the print job, including an operation for starting printing, on condition that the user is authenticated as the owner of the job by inputting a correct password from the console section 210 of the image forming apparatus 1000. The setting of a secure print job is made so as to maintain the security of a print job by restricting execution of printing by means of a password. Thus, the image forming apparatus 1000 has a secure print function that allows, when a user intends to perform operations related to a print job for printing an image on a recording sheet, the user to perform the operations related to the print job on condition that the user is authenticated as the owner of the print job.

As shown in FIG. 2A, on the printer driver setting screen, denoted by reference numeral 301, it is possible to make settings on printing, including whether or not to use secure printing, a sheet size, the number of copies, and whether or not to include a stamp. To activate the setting for secure printing, the user enters a check mark in a secure print usage checkbox 302, and presses an OK button 303. To abort the setting operation, the user presses a cancel button 304.

As shown in FIG. 2B, on the secure print setting screen, denoted by reference numeral 321, a user name entry form 322 and a password entry form 323 are displayed. Note that user information of the PC 21 being used by the user may be set as a default value in the user name entry form 322. Further, the printer driver 22 may set a default value in the password entry form 323. To finalize the settings on the secure print setting screen, the user presses an OK button 324. To abort the setting operation, the user presses a cancel button 325.

The PC 21 sends a print job according to the settings made on the above-described setting screens.

Figure 3:
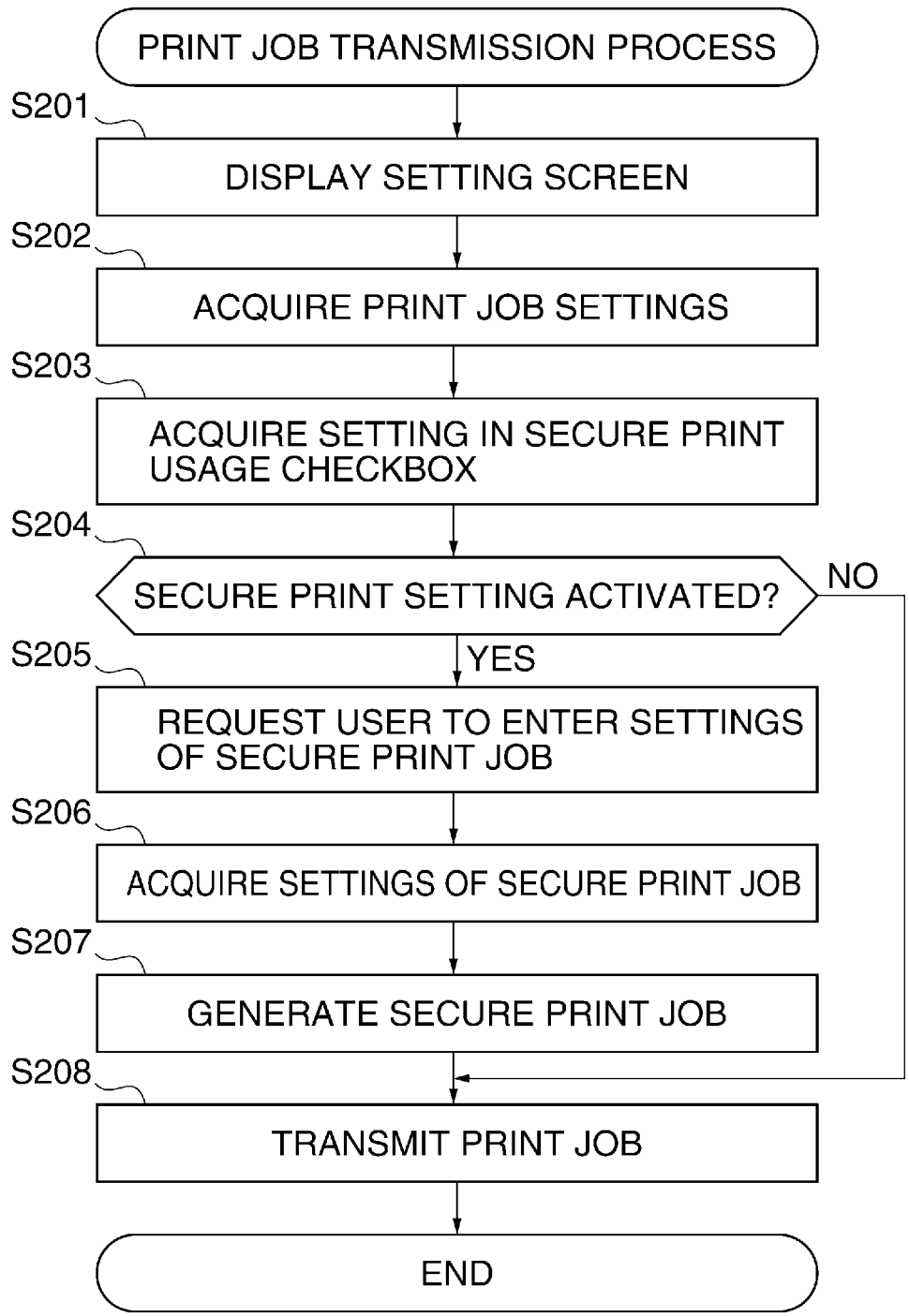
FIG. 3 is a flowchart of a print job transmission process executed by a CPU appearing in FIG. 1.

FIG. 3 is a flowchart of a print job transmission process executed by the CPU 20 appearing in FIG. 1.

Referring to FIG. 3, the PC operation section 23 receives an instruction from the user for displaying the printer driver setting screen, and displays the printer driver setting screen 301 on the PC display section 24 (step S201).

Next, the PC operation section 23 acquires the settings of a print job, appearing in the printer driver setting screen 301, which have been made by user's operations (step S202), and configures settings related to the print job based on the acquired settings.

Then, the printer driver 22 acquires a setting in the secure print usage checkbox 302 (step S203).

Then, the printer driver 22 determines whether or not the secure print setting has been activated based on the acquired setting in the secure print usage checkbox 302 (step S204).

If it is determined in the step S204 that the secure print setting has not been activated (NO to the step S204), the printer driver 22 sends the print job as a normal print job which is not a secure print job to the image forming apparatus 1000 (step S208), followed by terminating the present process.

On the other hand, if it is determined in the step S204 that the secure print setting has been activated (YES to the step S204), the printer driver 22 displays the secure print setting screen 321 on the PC display section 24, and requests the user to enter settings of a secure print job (step S205).

The printer driver 22 acquires the settings of the secure print job entered by the user on the secure print setting screen 321 (step S206).

Then, the printer driver 22 generates a secure print job by adding a user name and a password to the image data (step S207). Then, the printer driver 22 sends the print job as the secure print job to the image forming apparatus 1000 (step S208), followed by terminating the present process.

Although the user name is used in the step S207, not only the user name but also other identification information, such as a domain name of the PC 21 used by the user, may be added to the information.

Figure 4:
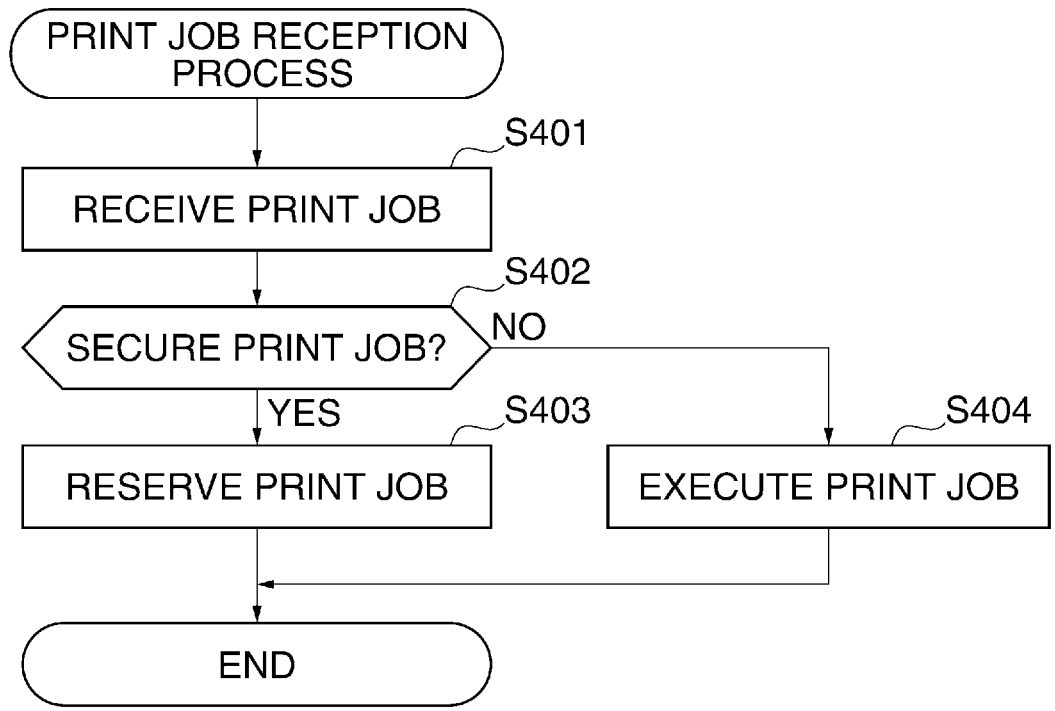
FIG. 4 is a flowchart of a print job reception process executed by a CPU of the image forming apparatus.

FIG. 4 is a flowchart of a print job reception process executed by the CPU 205 of the image forming apparatus 1000 appearing in FIG. 1.

Referring to FIG. 4, the CPU 205 receives a print job sent from the PC 21 (step S401), stores the received print job in the HDD 208, and determines whether or not the received print job is a secure print job (step S402).

If it is determined in the step S402 that the received print job is not a secure print job (NO to the step S402), the CPU 205 executes the received print job (step S404), followed by terminating the present process.

On the other hand, if it is determined in the step S402 that the received print job is a secure print job (YES to the step S402), the CPU 205 reserves the print job (step S403), followed by terminating the present process. "To reserve a print job" is in other words "to suspend execution of the print job".

Next, a description will be given of a user interface displayed on the console section 210 in an access control process for controlling operations for starting the image forming apparatus 1000, causing a secure print job to be executed, and so forth.

Figure 5A:
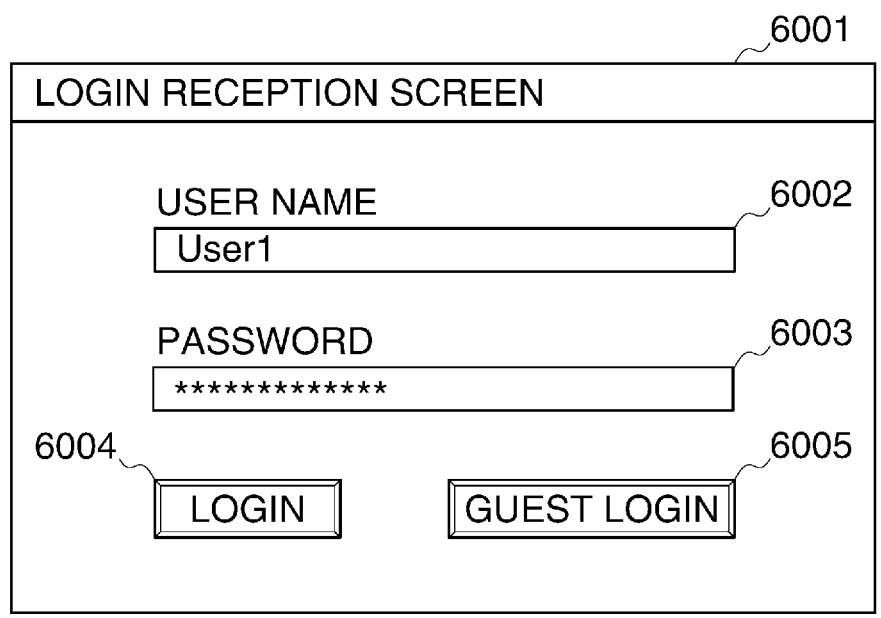
FIGS. 5A and 5B are diagrams showing examples of a login reception screen displayed on a console section appearing in FIG. 1.
Figure 5B:
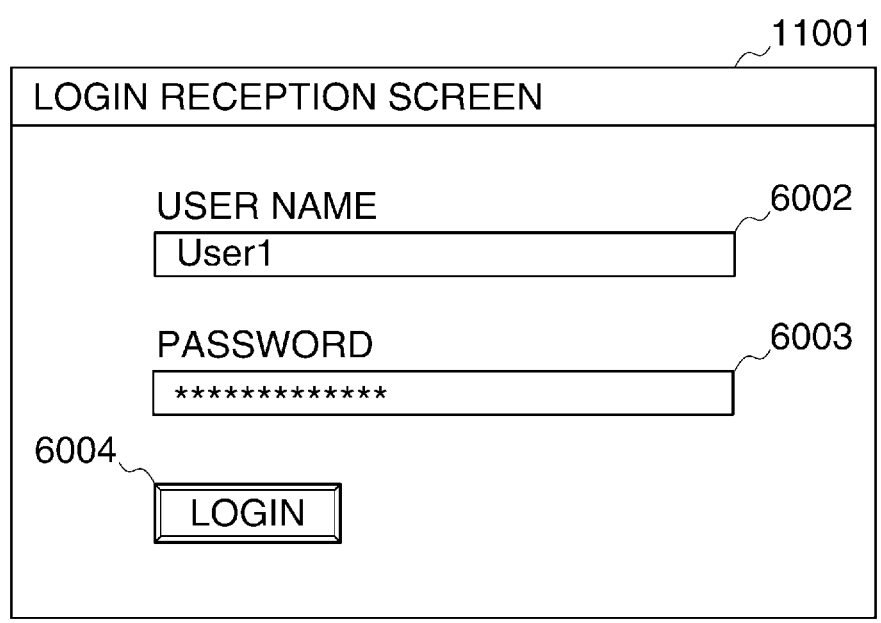

FIGS. 5A and 5B are diagrams showing examples of a login reception screen displayed on the console section 210 appearing in FIG. 1.

FIG. 5A shows the login reception screen, denoted by reference numeral 6001, displayed in a case where guest login is provided. On the other hand, FIG. 5B shows the login reception screen, denoted by reference numeral 11001, displayed in a case where guest login is not provided.

Referring to FIGS. 5A and 5B, a user name entry field 6002 is a field for inputting a user name of his/her own by the user. A password entry field 6003 is a field for inputting a user's password.

A login button 6004 is used for causing the image forming apparatus 1000 to execute authentication so as to log in to the image forming apparatus 1000 after the user has input the user name and password. By pressing this button, a user authentication process is executed.

Further, a guest login button 6005 appearing in FIG. 5A is used by a user who is not managed by the image forming apparatus 1000, for logging in to the image forming apparatus 1000 as a guest user (or unknown user). In contrast to the guest user, a user who is managed by the image forming apparatus 1000 is sometimes expressed as a general user in the following description. Thus, the users of the image forming apparatus 1000 include general users whose user names are managed by the image forming apparatus 1000 and guest users whose user names are not managed by the image forming apparatus 1000.

Further, differently from the login reception screen 6001, the guest login button 6005 is not displayed on the login reception screen 11001 shown in FIG. 5B.

Figure 6:
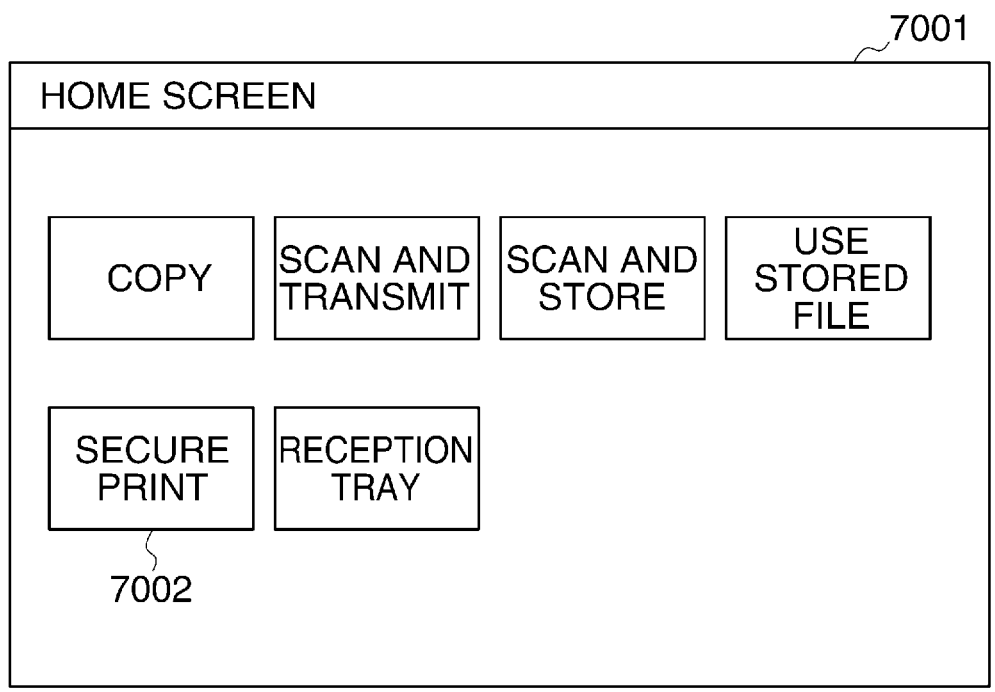
FIG. 6 is a diagram showing an example of a home screen displayed on the console section.

FIG. 6 is a diagram showing an example of a home screen displayed on the console section 210 appearing in FIG. 1.

Referring to FIG. 6, the home screen, denoted by reference numeral 7001, is used by the user for making use of various functions equipped in the image forming apparatus 1000, such as a copy function, a scan-and-transmit function, a scan-and-store function, a stored file-using function, a secure print function, and a reception tray function. A secure print button 7002 on the home screen 7001 is for handling a secure print job.

FIGS. 7A and 7C are diagrams showing examples of a secure print handling screen displayed on the console section 210 appearing in FIG. 1.

Referring to FIGS. 7A to 7C, a job list 8002 on the secure print handling screen, denoted by reference numeral 8001, is an area for displaying a list of secure print jobs. A job selection checkbox 8005 is for selecting a secure print job.

A print button 8003 is for starting printing for a selected secure print job. A cancel button 8004 is for canceling printing of the selected secure print job.

The user can select a secure print job to be handled, by entering a check mark in the job selection checkbox 8005, and instruct the image forming apparatus 1000 to start or cancel printing by pressing the print button 8003 or the cancel button 8004, respectively.

FIG. 7A shows an example of the secure print handling screen on which some of the job names are masked with asterisks.

In FIG. 7A, as for the secure print jobs having the user name "User 1", the job names are displayed.

On the other hand, as for the secure print jobs having the user names "User 2" and "User 3", which are not "User 1", the job names are masked with asterisks.

Further, if the user selects a job having the user name "User 2" or "User 3" by entering a check mark in the job selection checkbox 8005 on the secure print handling screen 8001 shown in FIG. 7A, the print button 8003 and the cancel button 8004 are grayed out, and hence the user can perform neither of handling operations for printing and canceling.

FIG. 7B shows an example of the secure print handling screen on which all job names are masked with asterisks.

Even when the user selects any of the jobs by entering a check mark in the job selection checkbox 8005 on the secure print handling screen 8001 shown in FIG. 7B, the print button 8003 and the cancel button 8004 are grayed out, and hence the user perform neither of handling operations for printing and canceling.

Further, in FIG. 7A, when the user presses the print button 8003 or the cancel button 8004, a password entry screen, not shown, for the secure print job is displayed.

The user inputs the password added to the print job on the password entry screen to thereby complete handling of the job. However, unless the input password matches the password added to the print job, the handling of the instructed job is not executed.

FIG. 7C shows an example of the secure print handling screen on which none of the job names are masked.

Even when the user selects any of the jobs by entering a check mark in the job selection checkbox 8005 on the secure print handling screen 8001 shown in FIG. 7C, the print button 8003 and the cancel button 8004 are not grayed out, and hence the user is allowed to perform handling operations for printing and canceling.

Figure 8:
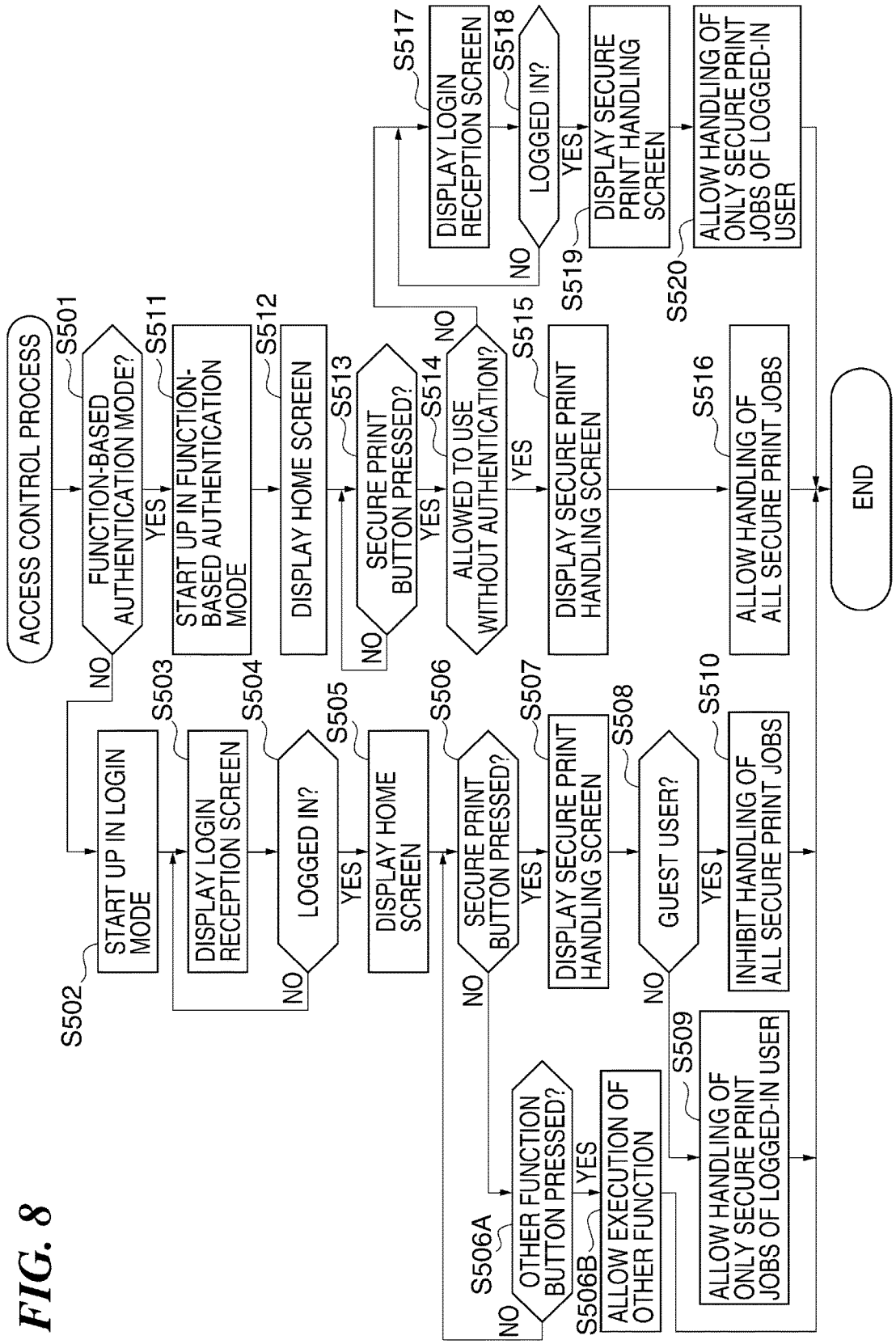
FIG. 8 is a flowchart of an access control process executed by the CPU.

FIG. 8 is a flowchart of an access control process executed by the CPU 205 appearing in FIG. 1.

The access control process in FIG. 8 is executed when the image forming apparatus 1000 is started. Further, an operation mode in which the access control process is performed includes a login mode and a function-based authentication mode.

The login mode is a mode in which the image forming apparatus 1000 always executes user authentication before the user is allowed to use the image forming apparatus 1000. Further, in the login mode, the image forming apparatus 1000 has a function of authenticating even a user who is not managed by the image forming apparatus 1000, as a guest user.

On the other hand, the function-based authentication mode is an operation mode in which whether or not to require user authentication can be determined for each of the various functions equipped in the image forming apparatus 1000 before a user uses the image forming apparatus 1000. The various functions include the copy function, a print job handling function, the scan-and-transmit function for scanning and transmitting an image, and a detailed information-displaying function for displaying detailed information on the history of executed print jobs.

In the function-based authentication mode, for example, it is possible to set the copy function as a function which does not require user authentication and is allowed to be used by any user without performing user authentication, and set the print job handling function as a function which requires user authentication, and is allowed to be used only in a case where the user is authenticated.

Referring to FIG. 8, the CPU 205 determines whether or not the operation mode is the function-based authentication mode (step S501). If it is determined in the step S501 that the operation mode is not the function-based authentication mode, but the login mode (NO to the step S501), the CPU 205 executes a startup process in the login mode (step S502).

When the startup process in the login mode is completed, the CPU 205 displays the login reception screen 6001, described with reference to FIG. 5A, on the console section 210 (step S503). In this step, the user executes login after entering a user name and a password from the login reception screen 6001, or executes login as a guest user.

If the login authentication has failed (NO to a step S504), the CPU 205 returns to the step S503, whereas if the login authentication is successful, allowing the user to log in (YES to the step S504), the CPU 205 displays the home screen 7001, described with reference to FIG. 6, on the console section 210 (step S505).

Next, if the user presses the secure print button 7002 on the home screen 7001 to handle a secure print job (YES to a step S506), the CPU 205 displays the secure print handling screen 8001, described with reference to FIG. 7A or 7B, on the console section 210 (step S507).

On the other hand, if the secure print button 7002 has not been pressed in the step S506 (NO to the step S506), the CPU 205 determines whether or not any other button has been pressed (step S506A). If no button has been pressed (NO to the step S506A), the CPU 205 returns to the step S506, whereas if one of the other buttons has been pressed (YES to the step S506A), the CPU 205 allows the user to execute processing of a function corresponding to the pressed button (step S506B).

When the secure print handling screen is displayed in the step S507, the CPU 205 determines whether or not the currently logged-in user is a guest user (step S508). If it is determined in the step S508 that the currently logged-in user is a general user (NO to the step S508), the CPU 205 allows the currently logged-in user to perform only an operation related to the secure print job of his/her own (step S509), followed by terminating the present process. As described above, in the present embodiment, when a user is authenticated as a general user, the user is allowed to perform the operation related to the secure print job of the general user, whereas when a user is authenticated as a guest user, as described hereinafter, the user is inhibited from performing any of operations related to all the secure print jobs.

In this process, depending on whether or not a user name of the currently logged-in user matches a user name added to a secure print job, control is performed for switching the method of displaying the list of jobs and determining whether or not to allow the currently logged-in user to perform an operation related to the secure print job.

That is, when the currently logged-in user has the user name of "User 1", the secure print handling screen 8001 shown in FIG. 7A is displayed on the console section 210.

On the other hand, if it is determined in the step S508 that the currently logged-in user is a guest user (YES to the step S508), the CPU 205 inhibits the user from handling any of all secure print jobs (step S510), followed by terminating the present process. In this step, the secure print handling screen 8001 shown in FIG. 7B is displayed on the console section 210.

Referring again to the step S501, if it is determined in the step S501 that the operation mode is the function-based authentication mode (YES to the step S501), the CPU 205 executes the startup process in the function-based authentication mode (step S511).

When the startup process in the function-based authentication mode is completed, the CPU 205 displays the home screen 7001, described with reference to FIG. 6, on the console section 210 (step S512).

Next, when the user presses the secure print button 7002 to handle a secure print job on the home screen 7001 (YES to a step S513), the CPU 205 determines whether or not a secure print handling function is set to be allowed to be used without user authentication in the function-based authentication mode (step S514). The "secure print handling function" is intended to mean a function for providing operations related to a secure print job, such as a handling operation for executing printing of the secure print job and a handling operation for canceling the secure print job.

If it is determined in the step S514 that the secure print handling function is set not to require user authentication (YES to the step S514), the CPU 205 displays the secure print handling screen 8001, described with reference to FIG. 7C, on the console section 210 (step S515).

Then, the CPU 205 allows the user to perform handling of all secure print jobs (step S516), followed by terminating the present process.

In FIG. 7C, none of the "job names" of all secure print jobs are masked, whereby the user is allowed to perform handling operations for printing and canceling for all jobs. However, since a password has been added to each secure print job, unless the user enters a correct password, neither of handling operations for printing and canceling is actually completed.

Therefore, a user who does not know the password cannot execute any handling operation, and hence the security level is prevented from being lowered.

Further, as for operations related to normal print jobs other than the secure print jobs, the access control is performed such that a currently logged-in user is allowed to perform only an operation related to a print job of his/her own. Therefore, it is possible to maintain the security.

On the other hand, if it is determined in the step S514 that the secure print handling function is not set to be allowed to be used without user authentication (NO to the step S514), the CPU 205 displays the login reception screen 11001, described with reference to FIG. 5B, on the console section 210 (step S517). In this step, the user executes login by entering the user name and the password from the login reception screen 6001.

Further, the guest login button is not displayed on the login reception screen 11001. This is because the image forming apparatus 1000 does not provide a login function to be used by a guest user in the function-based authentication mode.

If the login authentication has failed (NO to a step S518), the CPU 205 returns to the step S517, whereas if the login authentication is successful, allowing the user to log in to the image forming apparatus 1000 (YES to the step S518), the CPU 205 displays the secure print handling screen 8001, described with reference to FIG. 7A, on the console section 210 (step S519).

Then, the CPU 205 allows the currently logged-in user to perform only the operation related to the secure print job of his/her own (step S520), followed by terminating the present process.

According to the access control process in FIG. 8, even in a case where the access control is performed to allow a user who has logged in according to user authentication to perform only an operation related to a print job of the currently logged-in user, when the secure print handling function is set not to require user authentication in the function-based authentication mode, the control is performed to allow the user to handle a secure print job.

Therefore, when the user handles the secure print job, the user is allowed to perform handling of the secure print job without performing the login operation, which makes it possible to improve operability and user-friendliness.

On the other hand, as for a normal print job which is not restricted by means of a password, the access control is performed such that a user who has logged in according to user authentication is allowed to perform only a handling operation of the print job of his/her own, and hence the security is maintained.

Further, as shown in the step S514, according to the present embodiment, it is possible to flexibly control whether or not to perform authentication when a user performs operations related to various functions equipped in the image forming apparatus, according to the setting of whether or not each function is allowed to be used without authentication.

Further, as shown in the steps S514 to S520, in the present embodiment, when it is determined that an operation related to a secure print job is set to require authentication, the operation related to the secure print job of a general user is allowed to be executed, whereas the operation related to the secure print job of a guest user is not allowed to be executed.

Figure 9A:
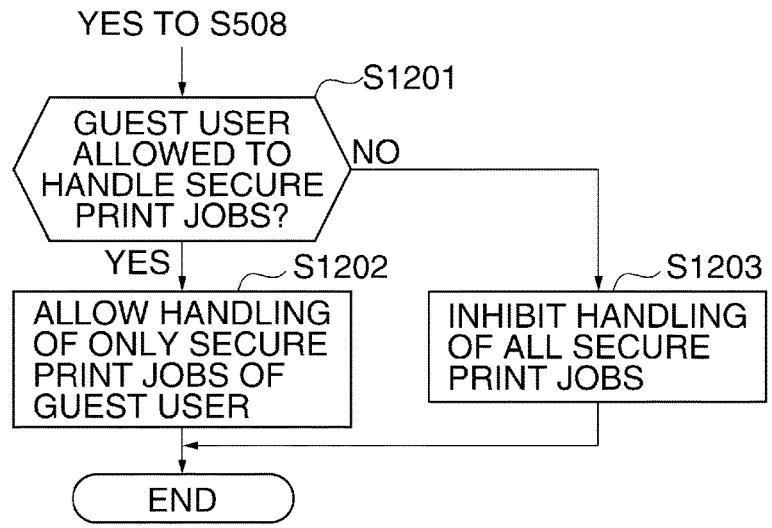
FIGS. 9A and 9B are flowcharts of variations of the access control process in FIG. 8.
Figure 9B:
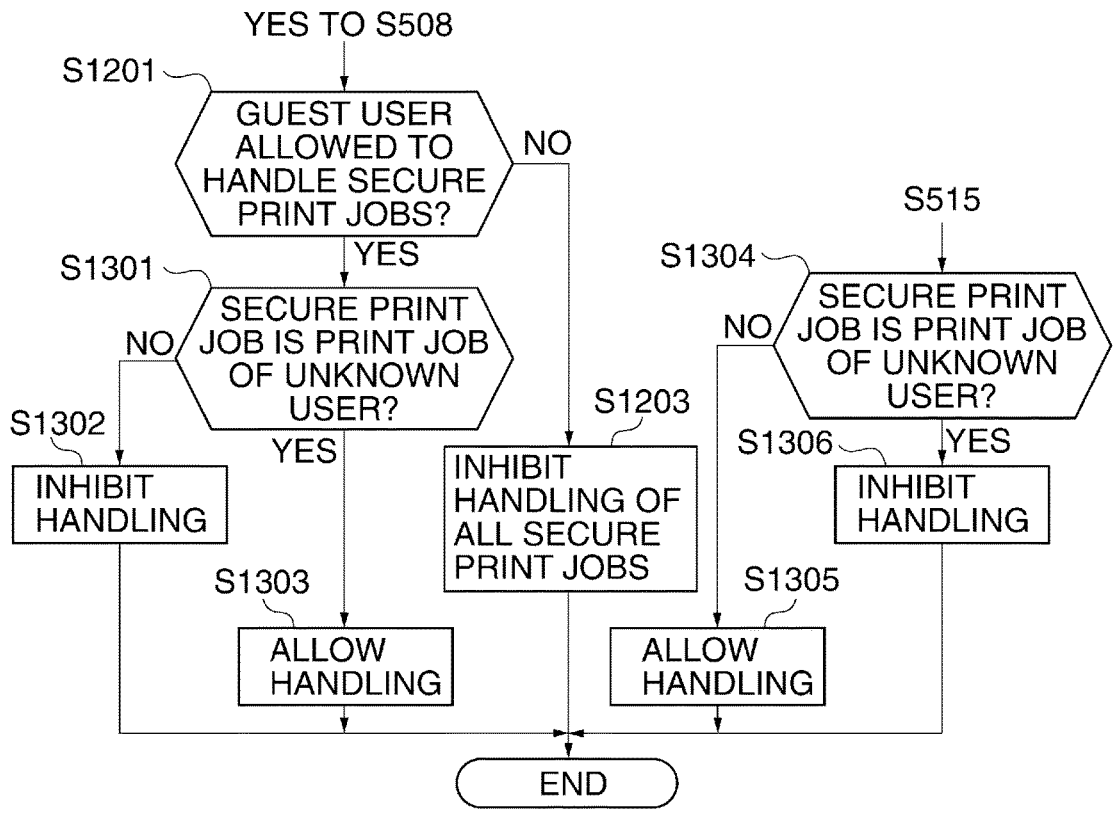

FIGS. 9A and 9B are flowcharts of variations of the access control process in FIG. 8.

In the variation of the FIG. 8 access control process, shown in FIG. 9A, it is preconditioned that the setting for switching whether or not to allow a user to perform handling of secure print jobs has been made also for a user who has logged in as a guest user.

The variation of the FIG. 8 access control process, shown in FIG. 9A, differs from the access control process in FIG. 8 from after the affirmative answer to the question of the step S508, and hence FIG. 9A shows only different steps following the step S508.

Referring to FIG. 9A, the CPU 205 determines whether or not the setting of secure print jobs is such that secure print jobs are allowed to be handled also by a guest user (step S1201).

If it is determined in the step S1201 that the setting of secure print jobs is such that secure print jobs are allowed to be handled also by a guest user (YES to the step S1201), the CPU 205 allows the user to perform handling of only secure print jobs of the guest user (step S1202), followed by the present process. Thus, in the present embodiment, when a user is authenticated as a general user, the user is allowed to perform an operation related to a secure print job of the general user, and when a user is authenticated as a guest user, the user is allowed to perform operations related to secure print jobs only in a case where the setting of secure print jobs is such that secure print jobs are allowed to be handled also by a guest user.

This causes the secure print handling screen described with reference to FIG. 7C to be displayed on the console section 210, thereby allowing the guest user as well to perform the operation related to the secure print job.

On the other hand, if it is determined in the step S1201 that the setting of secure print jobs is not such that secure print jobs are allowed to be handled also by a guest user (NO to the step S1201), the CPU 205 inhibits the user from handling any of all secure print jobs (step S1203), followed by terminating the present process.

This causes the secure print handling screen described with reference to FIG. 7B to be displayed on the console section 210, thereby inhibiting the user from handling any of all secure print jobs.

According to the variation of the FIG. 8 access control process, shown in FIG. 9A, it is possible to make settings which permit even a guest user to handle secure print jobs.

Next, the variation of the FIG. 8 access control process, shown in FIG. 9B, will be described. In the variation of the FIG. 8 access control process, shown in FIG. 9B, the secure print jobs which are allowed to be handled are switched depending on whether the operation mode is the login mode or the function-based authentication mode.

The secure print jobs which are allowed to be handled are switched depending on whether the operation mode is the login mode or the function-based authentication mode because different use cases are expected which are different in the purpose of use as a precondition, i.e. a case where a guest user uses the secure print function in the login mode and a case where a user uses the secure print function without user authentication in the function-based authentication mode.

For example, in general, the guest user in the login mode is assumed to be not a user who uses the image forming apparatus 1000 on a daily basis, but a user who temporarily uses the same as a guest.

On the other hand, it is generally assumed that the function for allowing a user to use the image forming apparatus 1000 without user authentication in the function-based authentication mode is used by a user who wishes to use the image forming apparatus 1000 in an easy and abbreviated manner on a daily basis without authentication.

The variation of the FIG. 8 access control process, shown in FIG. 9B, differs from the access control process in FIG. 8 from after the affirmative answer to the question of the step S508, and in the step S516 and the subsequent steps, and hence FIG. 9B shows only the different steps. This variation is the same as FIG. 9A in processing in which the CPU 205 proceeds from the step S508 to the step S1201, and when the answer to the question of the step S1201 is negative, the CPU 205 proceeds to the step S1203, and hence the description starts from after the affirmative answer to the question of the step S1201.

In the variation of the FIG. 8 access control process, shown in FIG. 9B, it is determined as to each of the secure print jobs reserved in the image forming apparatus 1000 whether or not a user name indicative of an owner of each job, which is added to the job, matches any user name of one or more users managed by the image forming apparatus 1000.

According to this determination performed as to each of the secure print jobs, if a user who is an owner of a secure print job is not a user managed by the image forming apparatus 1000, the secure print job is regarded as a print job of an unknown user, whereas if the user is a general user, the secure print job is naturally regarded as a print job of the general user.

Based on this, the CPU 205 determines whether or not the secure print job is a print job of an unknown user (step S1301).

If it is determined in the step S1301 that the secure print job is a print job of an unknown user (YES to the step S1301), it is judged that the secure print job is a print job of the unknown user who has logged in as a guest user, and allows the user to handle the secure print job (step S1303), followed by terminating the present process.

On the other hand, if it is determined in the step S1301 that the secure print job is not a print job of an unknown user (NO to the step S1301), this indicates that an unknown user who has logged in as a guest user is about to handle a print job of a general user, and hence the CPU 205 inhibits handling of the secure print job (step S1302), followed by terminating the present process.

Next, steps of the FIG. 9B access control process following the step S515 will be described.

First, similarly to the step S1301, the CPU 205 determines whether or not the secure print job is a print job of an unknown user (step S1304).

If it is determined in the step S1304 that the secure print job is a print job of an unknown user (YES to the step S1304), the secure print job is not a print job of a general user, which is set to be allowed to be used without authentication in order for the general user to easily use the secure print function in the function-based authentication mode, and hence the CPU inhibits the user from handling the secure print job (step S1306), followed by terminating the present process.

On the other hand, if it is determined in the step S1304 that the secure print job is not a print job of an unknown user (NO to the step S1304), the secure print job is a print job of a general user, which is set to be allowed to be used without authentication in order for the general user to easily use the secure print function in the function-based authentication mode, and hence the CPU 205 allows the user to handling the secure print job (step S1305), followed by terminating the present process.

FIGS. 10A and 10B are diagrams showing examples of the secure print handling screen displayed as a result of the variation of the FIG. 8 access control process, shown in FIG. 9B.

FIG. 10A shows an example of the secure print handling screen displayed on the console section 210 as a result of processing according to the steps S1301 and the step S1302 or processing according to the step S1303.

Referring to FIG. 10A, it is assumed that the user names "User 1", "User 2", and "User 3" are the user names of general users, and the user name "User 4" is a user name of an unknown user.

In this case, as shown on the secure print handling screen 8001, the secure print jobs having the user names "User 1", "User 2", and "User 3" are the print jobs of the general users, and all job names of these print jobs are masked with asterisks.

Further, if an unknown user selects these print jobs, the unknown user is inhibited from performing handling operations for printing and canceling.

On the other hand, it is judged that the secure print job having the user name "User 4" is a print job of an unknown user, and if the user who has logged in as a guest user selects this print job, the user is allowed to perform handling operations for printing and canceling.

As described above, the job names of secure print jobs of general users managed by the image forming apparatus 1000, i.e. users who use the image forming apparatus 1000 on a daily base are masked to a guest user who temporarily uses the image forming apparatus in the login mode, and the guest user is inhibited from handling the jobs, and hence it is possible to obtain the effect of preventing information from being leaked to an unknown user.

Further, FIG. 10B shows an example of the secure print handling screen displayed on the console section 210 as a result of processing according to the steps S1304 and S1305 or processing according to the step S1306.

Also in FIG. 10B, it is assumed that the user names "User 1", "User 2", and "User 3" are the user names of general users, and the user name "User 4" is a user name of an unknown user.

In this case, as shown on the secure print handling screen 8001, the secure print jobs of the user names "User 1", "User 2", and "User 3" are the print jobs of the general users, and if a general user selects a job of his/her own from these print jobs, the general user is allowed to perform handling operations for printing and canceling.

On the other hand, the secure print job of the user name "User 4" is a print job of the unknown user, and the job name is masked with asterisks, and if a general user selects this print job as shown in the illustrated example in FIG. 10B, the general user is inhibited from performing handling operations for printing and canceling.

As described above, even in a case where the secure print handling function is used without authentication in the function-based authentication mode, only secure print jobs of a general user, i.e. a user who uses the image forming apparatus 1000 on a daily base, are allowed to be handled, and hence it is possible to obtain the advantageous effect of preventing unauthorized use by an unknown user.

Next, a description will be given of a second embodiment of the present invention. The present embodiment differs from the first embodiment in the display control process for controlling the displayed content on the secure print handling screen 8001 of the image forming apparatus 1000, more particularly the user interface displayed on the console section 210, and is the same in the other hardware configuration and in the software configuration, except processes described in detail hereinafter, as those of the first embodiment, and hence the component elements corresponding to those of the first embodiment are denoted by the same reference numerals, and description thereof is omitted. Hereinafter, the following description will be given of the different points.

Figure 11:
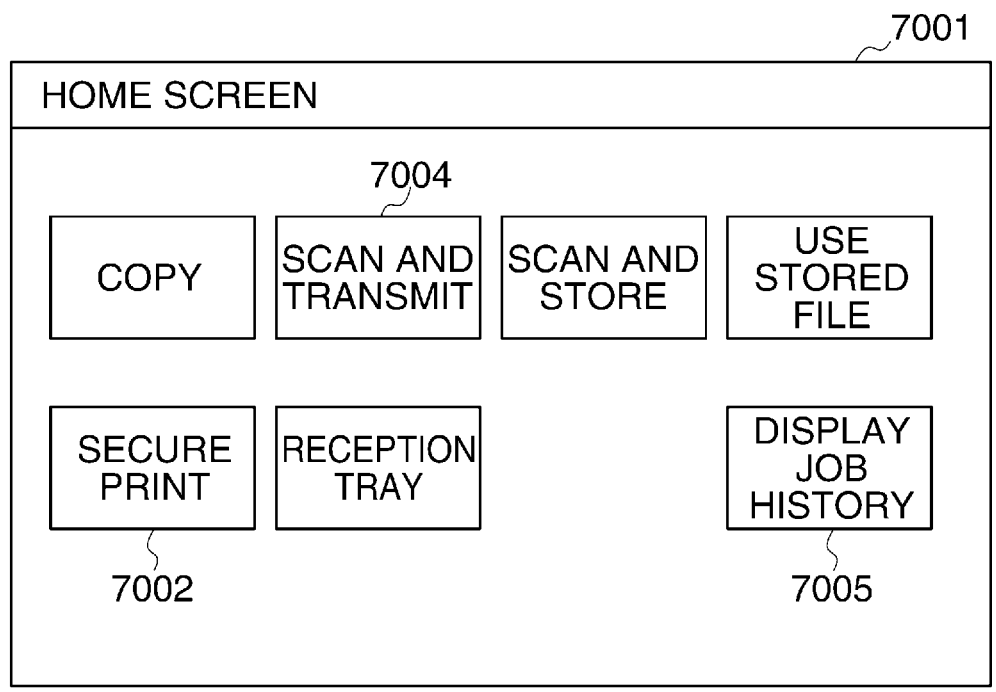
FIG. 11 is diagram showing an example of a home screen displayed on a console section of an image forming apparatus according to a second embodiment of the present invention.

FIG. 11 is a diagram showing an example of the home screen displayed on the console section 210 appearing in FIG. 1.

Referring to FIG. 11, the home screen 7001 has a job history display button 7005 newly added to the home screen described with reference to FIG. 6. By pressing the job history display button 7005, the history of print jobs is displayed. This history will be described hereinafter. Further, the following description is given of an example in which a scan-and-transmit button 7004 is used. The scan-and-transmit button 7004 is a button used for selecting a function for scanning an original using the scanner section 201 and transmitting data to a destination.

FIGS. 12A to 12C are diagrams showing examples of the secure print handling screen displayed on the console section 210 appearing in FIG. 1.

FIG. 12A shows an example of the display of a list of all secure print jobs reserved in the image forming apparatus 1000. The cancel button 8004 is grayed out and the user is prevented from pressing it.

FIG. 12B shows an example of the display of the list of all secure print jobs reserved in the image forming apparatus 1000. FIG. 12B differs from FIG. 12A in that the cancel button 8004 is not grayed out and the user is allowed to press it.

FIG. 12C shows an example of the display of a list of only secure print jobs out of all secure print jobs reserved in the image forming apparatus 1000, each having a user name, added to the secure print job, which matches the user name of a currently logged-in user.

In FIG. 12C, only secure print jobs of the user who has logged in using the user name "User 1" are displayed by way of example.

Further, an all job display button 8006 is provided on the secure print handling screen shown in FIG. 12C. The all job display button 8006 is a button used for displaying the list of all secure print jobs, and when the user presses the all job display button 8006, the display screen is changed to the screen shown in FIG. 12A, and the list of all secure print jobs reserved in the image forming apparatus 1000 is displayed. Note that in this case, however, the currently logged-in user is allowed to perform a handling operation for canceling only for a secure print job of his/her own.

Figure 13:
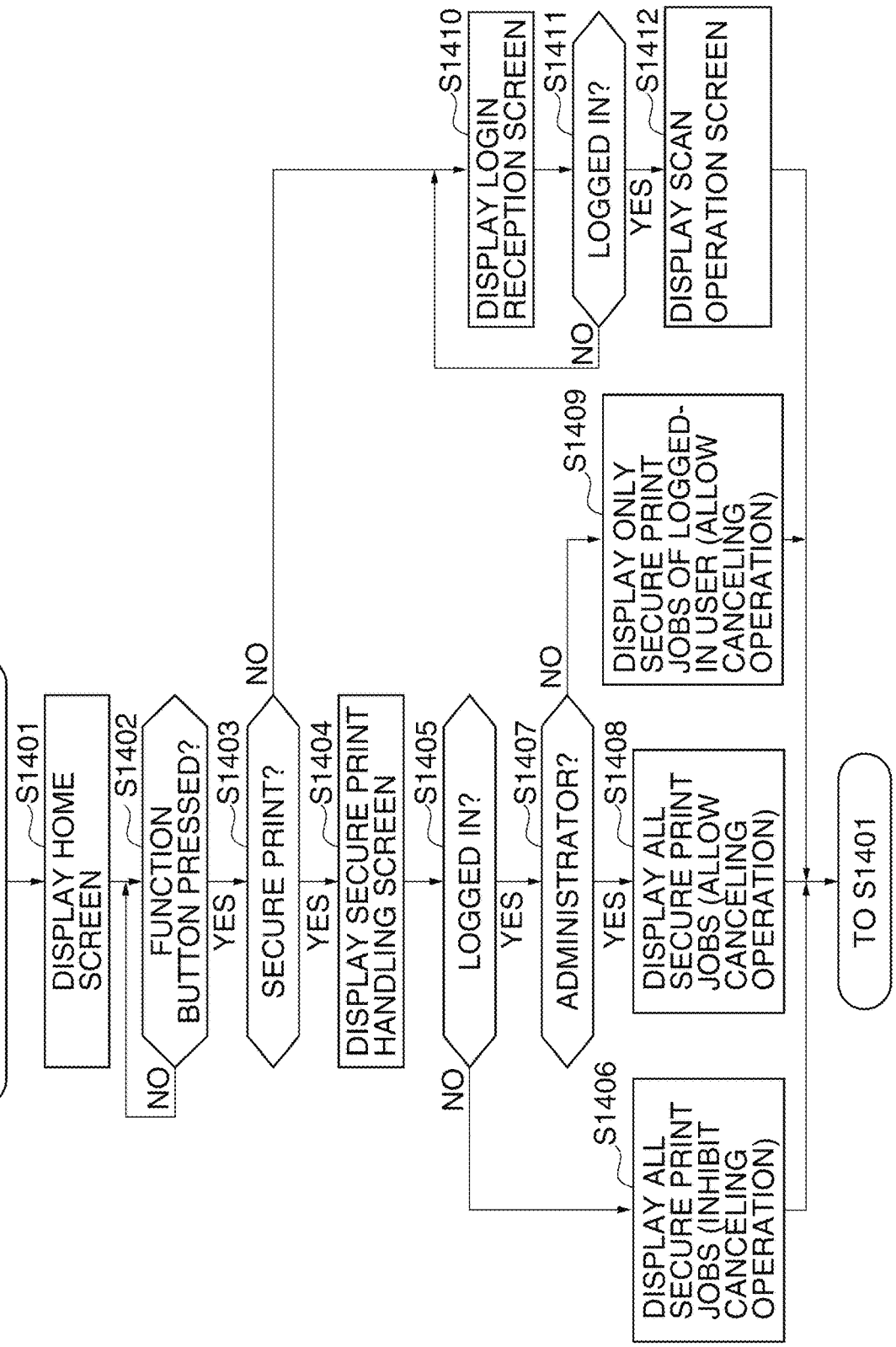
FIG. 13 is a flowchart of a display control process executed by a CPU of the image forming apparatus.

FIG. 13 is a flowchart of a display control process executed by the CPU 205 appearing in FIG. 1.

Note that in the display control process in FIG. 13, it is assumed that the secure print function of the image forming apparatus 1000 is set to be allowed to be used without user authentication, and the scan-and-transmit function is set to require user authentication.

Referring to FIG. 13, the CPU 205 displays the home screen 7001 described with reference to FIG. 11 on the console section 210 (step S1401).

Next, the CPU 205 determines whether or not the user has pressed any one of the function buttons (step S1402). Note that the function buttons referred to in the present process are limited to the secure print button 7002 and the scan-and-transmit button 7004, and description of cases where other function buttons are pressed are omitted.

Then, the CPU 205 determines whether or not the user has pressed secure print button 7002 (step S1403). If it is determined in the step S1403 that the user has pressed the secure print button 7002 (YES to the step S1403), the CPU 205 displays the secure print handling screen 8001 described with reference to any of FIGS. 12A to 12C on the console section 210 (step S1404).

As mentioned above, the secure print function is set to be allowed to be used without user authentication according to the settings of the function-based authentication mode, and hence it is not necessary to display the login screen for authenticating a user by the image forming apparatus 1000.

Further, although FIGS. 12A to 12C show the screen on which the list of secure print jobs has already been displayed on the job list 8002, secure print jobs to be displayed on the job list 8002 are determined in the following steps.

Next, the CPU 205 determines whether or not the user has been authenticated by the image forming apparatus 1000, and is currently logged-in (step S1405).

If it is determined in the step S1405 that the user is not currently logged-in (NO to the step S1405), the CPU 205 displays the secure print handling screen described with reference to FIG. 12A (step S1406), and returns to the step S1401. As described above, in the present embodiment, when it is determined that the operations related to a secure print job are set not to require authentication and also the user has not been authenticated (NO to the step S1405), the user is allowed to perform ones of the operations related to the secure print job other than the canceling operation for deleting the secure print job displayed on the secure print handling screen.

The secure print handling screen enables the user to select his/her job of which the password the user knows to execute printing. Further, in FIG. 12A, the cancel button 8004 cannot be pressed as mentioned above, and hence it is also possible to prevent jobs of the others from being carelessly canceled.

On the other hand, if it is determined in the step S1405 that the user is currently logged-in (YES to the step S1405), the CPU 205 determines whether or not the currently logged-in user is an administrator (step S1407). Note that the administrator is a person who is in charge of the management of the image forming apparatus 1000, and is authenticated by the image forming apparatus 1000 as the administrator, in a manner distinguished from other users.

If it is determined in the step S1407 that the currently logged-in user is an administrator (YES to the step S1407), the CPU 205 displays the secure print handling screen described with reference to FIG. 12B (step S1408), and returns to the step S1401.

On the secure print handling screen shown in FIG. 12B, the administrator is allowed to perform the canceling operation for all secure print jobs, and can delete the secure print jobs unnecessarily reserved in the image forming apparatus 1000.

On the other hand, if it is determined in the step S1407 that the currently logged-in user is not an administrator (NO to the step S1407), the CPU 205 displays the secure print handling screen described with reference to FIG. 12C (step S1409), and returns to the step S1401.

As shown in FIG. 12C, the currently logged-in user who is not an administrator is enabled to immediately handle the print job without time and effort of searching for his/her print jobs. Thus, in the present embodiment, when it is determined that the operations related to the secure print job are set not to require authentication, and also the user is authenticated as an administrator, the user is allowed to perform the operations related to all of the secure print jobs. On the other hand, when the user is not authenticated as an administrator, the user is allowed to perform only operations related to a secure print job of the user.

Referring again to the step S1403, if it is determined in the step S1403 that the user has pressed not the secure print button 7002 but the scan-and-transmit button 7004 (NO to the step S1403), the CPU 205 displays the login reception screen 11001 described with reference to FIG. 5B (step S1410).

The login reception screen 11001 is displayed in this step because the "scan-and-transmit" function is set as a function which requires user authentication according to the settings of the function-based authentication function.

When the user enters a user name and a password from the login reception screen 11001 to execute login, and if login authentication has failed (NO to a step S1411), the CPU 205 returns to the step S1410, whereas if the login authentication is successful, allowing the user to log in (YES to the step S1411), the CPU 205 displays a scan operation screen, not shown, on the console section 210 (step S1412), and returns to the step S1401.

Although in the process in FIG. 13, the CPU 205 returns to the step S1401 after execution of the step S1412, if the user does not explicitly perform a logout operation, the login state is maintained.

Therefore, if the user intends to handle a secure print job in a state in which user's login is maintained as mentioned above, the CPU 205 proceeds from the step S1405 to the step S1407.

Further, where to proceed from the step S1407 is determined depending on the determination of whether or not the user who has logged in to the image forming apparatus 1000 is an administrator in the user authentication processing in the steps S1410 and S1411.

In the display control process in FIG. 13, the method of displaying secure print jobs and the control of access thereto for handling are properly switched and controlled depending on whether or not the user is currently logged-in, and further whether or not the currently logged-in user is an administrator. This makes it possible to improve the operability and user-friendliness.

Although in the display control process in FIG. 13, the method of displaying the secure print jobs and so on has been described, the method may be applied to any other print job, insofar as it is a print job including user information of a user who has issued the print job (owner of the print job).

Next, a description will be given of the display of the job history information. First, the user interface displayed on the console section 210 will be described.

FIGS. 14A to 14C are diagrams showing examples of a job history screen displayed on the console section 210 appearing in FIG. 1.

The job history screen, denoted by reference numeral 10001, shown in FIGS. 14A to 14C displays history information of jobs recorded in the HDD 208 of the image forming apparatus 1000.

Referring to FIGS. 14A to 14C, a job history list 10002 is an area for displaying a list of job history records.

A job history selection checkbox 10005 is for selecting a job history record. A detailed information button 10007 is for displaying detailed information of one job history record. The detailed information includes the number of pages, the number of printed sheets, a sheet size, color/monochrome, a document name, and so on, of each job.

The user can refer to the detailed history information by selecting a desired job history record by entering a check mark in the job history selection checkbox 10005 and pressing the detailed information button 10007.

FIG. 14A displays the job history screen 10001 in which the list of all job history records is displayed, but the job names of all job history records are masked with asterisks, and further the detailed information button 10007 is always grayed out for preventing the user from pressing it.

FIG. 14B displays the job history screen 10001 in which the list of all job history records and job names is displayed, and further the detailed information button 10007 is always displayed for allowing the user to refer to the detailed information.

FIG. 14C displays the job history screen 10001 in which the list of all job history records is displayed, but the displayed job names are only those of extracted job history records each having a user name which matches the user name of the currently logged-in user.

That is, the job name of a job history record not having a user name which matches the user name of the currently logged-in user is masked with asterisks. FIG. 14C shows an example in which only job history records of the user who has logged in using the user name "User 1" are extracted, and the job names of the extracted history records are displayed.

Further, the detailed information button 10007 is allowed to be pressed only when a job history record having a user name that matches the user name of the currently logged-in user is selected by entering a check mark in the job history selection checkbox 10005.

Assuming the image forming apparatus 1000 is configured as above, a process for controlling the display of the job history screen will be described.

Figure 15:
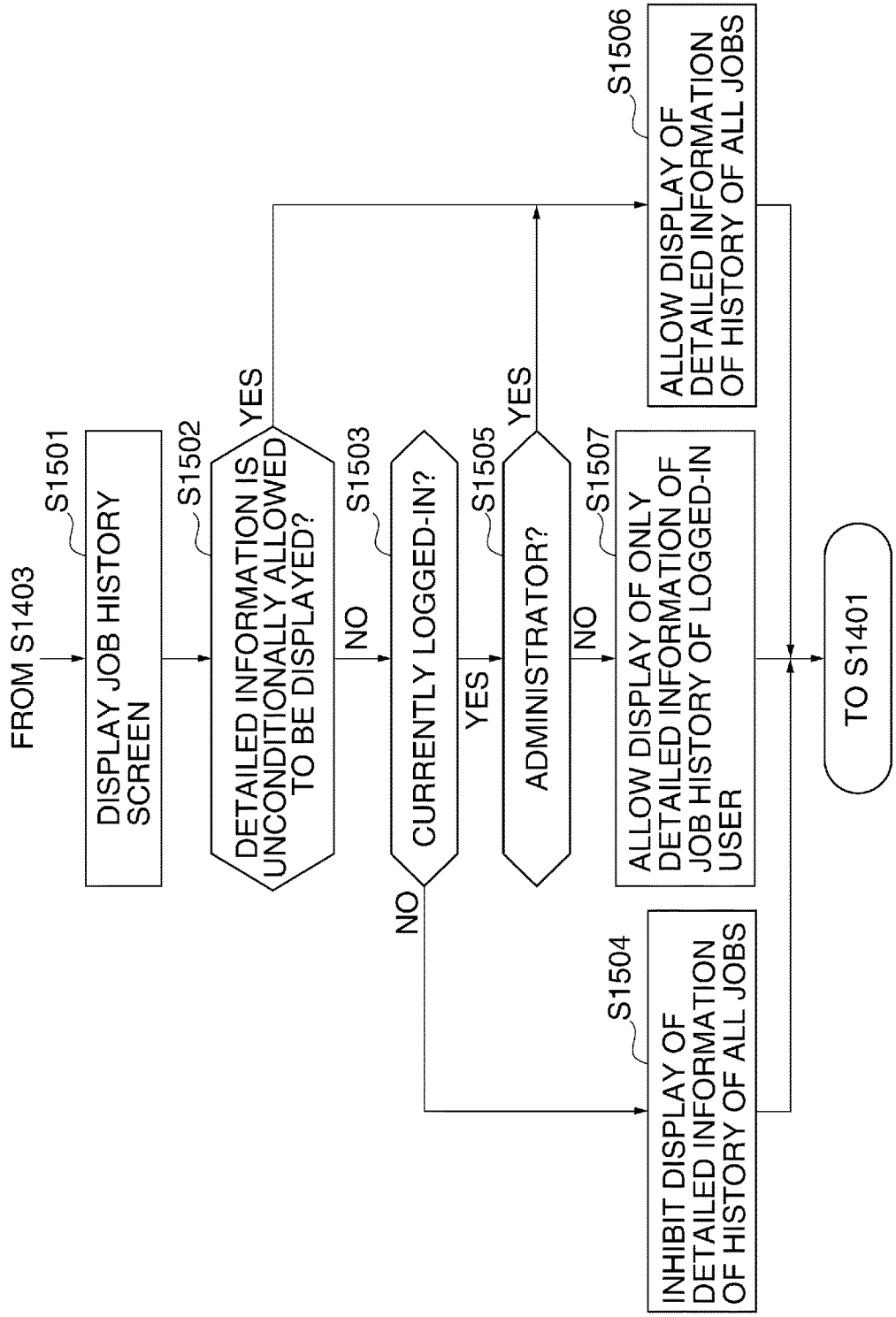
FIG. 15 is a flowchart of a variation of the display control process in FIG. 13.

FIG. 15 is a flowchart of a variation of the display control process in FIG. 13.

The display control process in FIG. 15 is for controlling the method of displaying the detailed information from the job history information. Further, the display control process in FIG. 15 is executed when the user presses the job history display button 7005 as a function button in the step S1403 in FIG. 13, and hence the steps following the step S1403 will be described.

Referring to FIG. 15, first, the CPU 205 displays the job history screen 10001, described with reference to FIGS. 14A to 14C, on the console section 210 (step S1501). In this step, it is assumed that a job history displaying function is set to be allowed to be used without user authentication according to the settings of the function-based authentication mode.

Next, the CPU 205 determines whether or not the detailed information is unconditionally allowed to be displayed (step S1502). In this determination, a setting in a checkbox provided in advance, in association with permission of displaying of the job history, is used. This checkbox is provided in advance as one of the setting items for configuring various settings of the image forming apparatus 1000, and normally, an administrator logs in to the image forming apparatus 1000 when making or changing the setting in the checkbox.

If it is determined in the step S1502 that the detailed information is unconditionally allowed to be displayed (YES to the step S1502), the CPU 205 displays the job history screen 10001 described with reference to FIG. 14B (step S1506), and returns to the step S1401.

On the other hand, if it is determined in the step S1502 that the detailed information is not unconditionally allowed to be displayed (NO to the step S1502), the CPU 205 determines whether or not the user is currently logged-in (step S1503).

If it is determined in the step S1503 that the user is currently not logged-in (NO to the step S1503), the CPU 205 displays the job history screen 10001 described with reference to FIG. 14A (step S1504), and returns to the step S1401. As described above, in the present embodiment, it is determined whether or not the detailed information is always allowed to be displayed, and if it is determined that the detailed information is not always allowed to be displayed, and also the user is not authenticated, the detailed information of all executed print jobs is inhibited from being displayed.

As described above, in a case where a user has not logged in to the image forming apparatus 1000, the job history screen 10001 in FIG. 14A is displayed, whereby it is possible to prevent unidentified users from being carelessly allowed to refer to the detailed information of the job history. However, the list of the job history is displayed, and hence the user can obtain minimum information, such as a result (OK/NG) of his/her own job.

On the other hand, if it is determined in the step S1503 that the user is currently logged-in (YES to the step S1503), the CPU 205 determines whether or not the currently logged-in user is an administrator (step S1505).

If it is determined in the step S1505 that the currently logged-in user is an administrator (YES to the step S1505), the CPU 205 displays the job history screen 10001 described with reference to FIG. 14B (step S1506), and returns to the step S1401. As described hereinabove, the job history screen 10001 in FIG. 14B is a screen on which the detailed information of all job history records is allowed to be displayed.

On the other hand, if it is determined in the step S1505 that the currently logged-in user is not an administrator (NO to the step S1505), the CPU 205 displays the job history screen 10001 described with reference to FIG. 14C (step S1507). As described hereinabove, the job history screen 10001 in FIG. 14C is a screen on which only job history records each having a user name which matches the user name of the currently logged-in user are extracted and the job names of the extracted jobs are displayed. Thus, in the present embodiment, it is determined whether or not the detailed information is always allowed to be displayed, and if it is determined that the detailed information is not always allowed to be displayed, and also the user is authenticated as an administrator, the detailed information of history of all executed print jobs is allowed to be displayed. On the other hand, if the user is not authenticated as an administrator, only detailed information of history of the executed print jobs of the user is allowed to be displayed.

Thus, in a state in which the user has logged in to the image forming apparatus 1000, it is possible to allow the user to refer to only history information of jobs of the currently logged-in user.

As described above, the job history displaying method is properly switched according to whether or not the user is currently logged-in, and further whether or not the currently logged-in user is an administrator, as described in the process shown in FIG. 15. This makes it possible to prevent information from being leaked from the job history without damaging the user-friendliness.

Further, although in the processes in FIGS. 13 and 15, as to the login operation of a user to the image forming apparatus 1000, login is executed e.g. when the user selects a function requiring user authentication, another operation method for user authentication may be provided. As another operation method for user authentication, for example, a function button may be added to the home screen 7001, for use in explicitly performing a login operation.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-015647, filed Jan. 30, 2013, which is hereby incorporated by reference herein in its entirety.

What is claimed is:

1. An image forming apparatus to which a user is capable of instructing execution of one function out of a plurality of functions including at least a print function, the image forming apparatus comprising:
a display device configured to display information; and
at least one controller having a processor that executes programs stored in a memory or circuitry having functions implemented therein,
the controller being configured to:
hold a plurality of print jobs including a print job associated with a user; and
control the display device to display, in response to an instruction to execute the print function, a screen including a list of print jobs of which a print instruction is available but has not yet been instructed,
wherein in a first case where the user has not been identified when the execution of the print function is instructed, the controller controls the display device to display the screen including the list of print jobs in which all of the plurality of print jobs are included in the list, and in a second case where the user has been identified when the execution of the print function is instructed, the controller controls the display device to display the screen including the list of print jobs in which only the print job associated with the identified user out of the plurality of print jobs is included in the list, and
wherein the controller controls, in the first case when the screen including the list of print jobs in which all of the plurality of print jobs are included in the list is displayed, display of the display device so as to disable deletion of the all of the plurality of print jobs displayed on the screen, and the controller controls, in the second case when the screen including the list of print jobs in which only the print job associated with the identified user out of the plurality of print jobs is included in the list is displayed, display of the display device so as to enable deletion of the print jobs associated with the identified user displayed on the screen.

2. The image forming apparatus according to claim 1, wherein the controller identifies the user based on a user authentication process.

3. The image forming apparatus according to claim 2, wherein the controller requests the user to input a name of the user in the user authentication process.

4. The image forming apparatus according to claim 2, wherein the controller requests the user to input a password in the user authentication process.

5. The image forming apparatus according to claim 2, wherein the controller does not execute the user authentication process when the print function out of the plurality of functions is instructed to be executed, but executes the user authentication process when a function different from the print function out of the plurality of functions is instructed to be executed.

6. The image forming apparatus according to claim 5, wherein the function different from the print function out of the plurality of functions is a scan function.

7. The image forming apparatus according to claim 6, further comprising a scanner that reads an original.

8. The image forming apparatus according to claim 5, wherein the controller is configured to set whether or not the user authentication process is to be executed when the execution of the print function is instructed.

9. The image forming apparatus according to claim 1, wherein in a third case where the user has been identified as an administrator when the execution of the print function is instructed, the controller controls the display device to display the screen including the list of print jobs in which all of the plurality of print jobs are included in the list, while also controlling display of the display device so as to enable deletion of the all of the plurality of print jobs displayed on the screen.

10. The image forming apparatus according to claim 1, wherein the controller specifies, based on user information given to a print job acquired from an external apparatus, a user associated with the acquired print job.

11. The image forming apparatus according to claim 1, wherein the controller holds, when determining that a print job acquired from an external apparatus is an object to be held, the print job.

12. The image forming apparatus according to claim 11, wherein the controller holds, when determining that the print job acquired from the external apparatus has a password added thereto, the print job.

13. The image forming apparatus according to claim 1, further comprising a printer that forms an image on a sheet.

14. The image forming apparatus according to claim 13, wherein the printer forms the image on the sheet after execution of a selected print job is instructed through the displayed screen including the list of print jobs of which the print instruction is available but had not yet been instructed.

15. The image forming apparatus according to claim 1, wherein the controller controls the display device to display a function selection screen including selection objects respectively corresponding to functions to be executed out of the plurality of functions, and the controller accepts the execution of the print function in response to a print function object being selected.

16. The image forming apparatus according to claim 1, further comprising a console that accepts a user's operation.

17. The image forming apparatus according to claim 1, further comprising a storage device configured to store print data used for printing.

18. The image forming apparatus according to claim 1, wherein the image forming apparatus operates in any one of a function-based authentication mode and a login mode.

19. A method of controlling an image forming apparatus to which a user is capable of instructing execution of one function out of a plurality of functions including at least a print function, the method comprising:
holding a plurality of print jobs including a print job associated with a user; and
causing a display device of the image forming apparatus to display, in response to an instruction to execute the print function, a screen including a list of print jobs of which a print instruction is available but has not yet been instructed,
wherein in a first case where the user has not been identified when the execution of the print function is instructed, the display device is caused to display the screen including the list of print jobs in which all of the plurality of print jobs are included in the list, and in a second case where the user has been identified when the execution of the print function is instructed, the display device is caused to display the screen including the list of print jobs in which only the print job associated with the identified user out of the plurality of print jobs is included in the list, and
wherein in the first case when the screen including the list of print jobs in which all of the plurality of print jobs are included in the list is displayed, the display device is caused to display the screen so as to disable deletion of the all of the plurality of print jobs displayed on the screen, and in the second case when the screen including the list of print jobs in which only the print job associated with the identified user out of the plurality of print jobs is included in the list is displayed, the display device is caused to display the screen so as to enable deletion of the print jobs associated with the identified user displayed on the screen.

20. A non-transitory computer-readable storage medium storing a computer program for causing a computer to execute a method of controlling an image forming apparatus to which a user is capable of instructing execution of one function out of a plurality of functions including at least a print function, the method comprising
holding a plurality of print jobs including a print job associated with a user; and
causing a display device of the image forming apparatus to display, in response to an instruction to execute the print function, a screen including a list of print jobs of which a print instruction is available but has not yet been instructed,
wherein in a first case where the user has not been identified when the execution of the print function is instructed, the display device is caused to display the screen including the list of print jobs in which all of the plurality of print jobs are included in the list, and in a second case where the user has been identified when the execution of the print function is instructed, the display device is caused to display the screen including the list of print jobs in which only the print job associated with the identified user out of the plurality of print jobs is included in the list, and
wherein in the first case when the screen including the list of print jobs in which all of the plurality of print jobs are included in the list is displayed, the display device is caused to display the screen so as to disable deletion of the all of the plurality of print jobs displayed on the screen, and in the second case when the screen including the list of print jobs in which only the print job associated with the identified user out of the plurality of print jobs is included in the list is displayed, the display device is caused to display the screen so as to enable deletion of the print jobs associated with the identified user displayed on the screen.

* * * * *